(12) United States Patent
Trant et al.

(10) Patent No.: US 10,458,678 B2
(45) Date of Patent: Oct. 29, 2019

(54) APPARATUS AND METHODS FOR HEATING WATER WITH REFRIGERANT AND PHASE CHANGE MATERIAL

(71) Applicant: Rheem Manufacturing Company, Atlanta, GA (US)

(72) Inventors: Troy E. Trant, Montgomery, AL (US); Qian Zhang, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 388 days.

(21) Appl. No.: 15/203,738

(22) Filed: Jul. 6, 2016

(65) Prior Publication Data

US 2018/0010822 A1    Jan. 11, 2018

(51) Int. Cl.
| | |
|---|---|
| *F24H 4/04* | (2006.01) |
| *F25B 13/00* | (2006.01) |
| *F25B 6/04* | (2006.01) |
| *F25B 39/04* | (2006.01) |
| *F25B 30/02* | (2006.01) |
| *F24H 6/00* | (2006.01) |

(Continued)

(52) U.S. Cl.
CPC ........... *F24H 4/04* (2013.01); *F24D 19/1054* (2013.01); *F24H 6/00* (2013.01); *F24H 9/2021* (2013.01); *F25B 6/04* (2013.01); *F25B 13/00* (2013.01); *F25B 30/02* (2013.01); *F25B 39/04* (2013.01); *F24D 11/0214* (2013.01); *F24D 17/02* (2013.01); *F24D 2200/123* (2013.01); *F24D 2220/08* (2013.01); *F24D 2220/10* (2013.01); *F24F 5/0096* (2013.01); *F24F 2221/183* (2013.01); *F25B 2313/003* (2013.01); *F25B 2313/0232* (2013.01); *F25B 2313/0234* (2013.01); *F25B 2339/042* (2013.01); *F25B 2339/047* (2013.01); *F25B 2400/0403* (2013.01); *F25B 2400/0409* (2013.01)

(58) Field of Classification Search
CPC .. F24H 4/04; F24H 9/2021; F24H 6/00; F24F 5/0096; F24D 19/1054; F24D 2220/10; F24D 2200/123; F24D 2220/08; F24D 17/02; F24D 11/0214; F25B 6/00
USPC ........................................................ 62/238.6
See application file for complete search history.

(56) References Cited

U.S. PATENT DOCUMENTS

| | | |
|---|---|---|
| 4,012,920 A | 3/1977 | Kirschbaum |
| 4,148,355 A | 4/1979 | Gehring |

(Continued)

FOREIGN PATENT DOCUMENTS

| | | |
|---|---|---|
| EP | 0151493 | 8/1985 |
| EP | 0240441 | 10/1987 |

(Continued)

OTHER PUBLICATIONS

International Search Report and Written Opinion dated Sep. 13, 2017 for PCT/US2017/040984.

*Primary Examiner* — Frantz F Jules
*Assistant Examiner* — Steve S Tanenbaum
(74) *Attorney, Agent, or Firm* — King & Spalding LLP

(57) ABSTRACT

An apparatus for heating water has a tank for storing water and an air conditioning system that defines a refrigerant flow path through which refrigerant flows. The refrigerant flow path passes through a heat exchanger so that refrigerant heat is contributed to the tank. The heat exchanger houses a phase change material. A controller controls operation of the water heating apparatus.

29 Claims, 19 Drawing Sheets

(51) Int. Cl.
F24H 9/20 (2006.01)
F24D 19/10 (2006.01)
*F24D 17/02* (2006.01)
*F24D 11/02* (2006.01)
*F24F 5/00* (2006.01)

(56) References Cited

U.S. PATENT DOCUMENTS

| | | |
|---|---|---|
| 4,238,933 A | 12/1980 | Coombs |
| 4,263,961 A | 4/1981 | Morawetz et al. |
| 4,380,912 A | 4/1983 | Edwards |
| 4,391,104 A | 7/1983 | Wendschlag |
| 4,508,101 A | 4/1985 | Carter et al. |
| 5,003,788 A | 4/1991 | Fischer |
| 5,105,633 A | 4/1992 | Briggs |
| 5,220,807 A | 6/1993 | Bourne et al. |
| 5,372,185 A | 12/1994 | Lannes |
| 5,495,723 A | 3/1996 | MacDonald |
| 5,687,706 A | 11/1997 | Goswami et al. |
| 6,477,855 B1 | 11/2002 | Findley et al. |
| 6,493,507 B2 | 12/2002 | Salyer |
| 7,040,108 B1 | 5/2006 | Flammang |
| 7,225,860 B2 | 6/2007 | Baginski et al. |
| 8,204,633 B2 | 6/2012 | Harbin, III et al. |
| 8,887,672 B2 | 11/2014 | Junge et al. |
| 2005/0183432 A1 | 8/2005 | Cowans et al. |
| 2006/0064995 A1 | 3/2006 | Rigal et al. |
| 2008/0236185 A1 | 10/2008 | Choi et al. |
| 2009/0049857 A1 | 2/2009 | Murakami et al. |
| 2010/0043483 A1 | 2/2010 | Jacob |
| 2010/0179705 A1 | 7/2010 | Flohr |
| 2010/0209084 A1 | 8/2010 | Nelson et al. |
| 2011/0058795 A1 | 3/2011 | Kleman et al. |
| 2011/0100009 A1 | 5/2011 | Lehar et al. |
| 2011/0120673 A1 | 5/2011 | Xiang et al. |
| 2011/0259025 A1 | 10/2011 | Noh et al. |
| 2013/0104574 A1 | 5/2013 | Dempsey et al. |
| 2013/0189594 A1 | 7/2013 | Breit et al. |
| 2014/0230477 A1 | 8/2014 | Furui et al. |
| 2014/0260392 A1* | 9/2014 | Hawkins ............... F25B 29/003 62/238.6 |
| 2015/0188388 A1 | 7/2015 | Torrent |
| 2015/0241087 A1 | 8/2015 | Lesage et al. |

FOREIGN PATENT DOCUMENTS

| | | | |
|---|---|---|---|
| EP | 2360439 | 8/2011 | |
| EP | 2489972 | 8/2012 | |
| EP | 2538145 | 12/2012 | |
| GB | 634574 A | 3/1950 | |
| GB | 1017665 A | 1/1966 | |
| GB | 2267962 A | 12/1993 | |
| WO | 2003036178 | 5/2003 | |
| WO | WO-03036178 A1 * | 5/2003 | ............ F24H 1/208 |
| WO | 2006039580 | 4/2006 | |
| WO | 2006128263 | 12/2006 | |
| WO | 2006128264 | 12/2006 | |
| WO | 2007146050 | 12/2007 | |
| WO | 2013061473 | 5/2013 | |

* cited by examiner

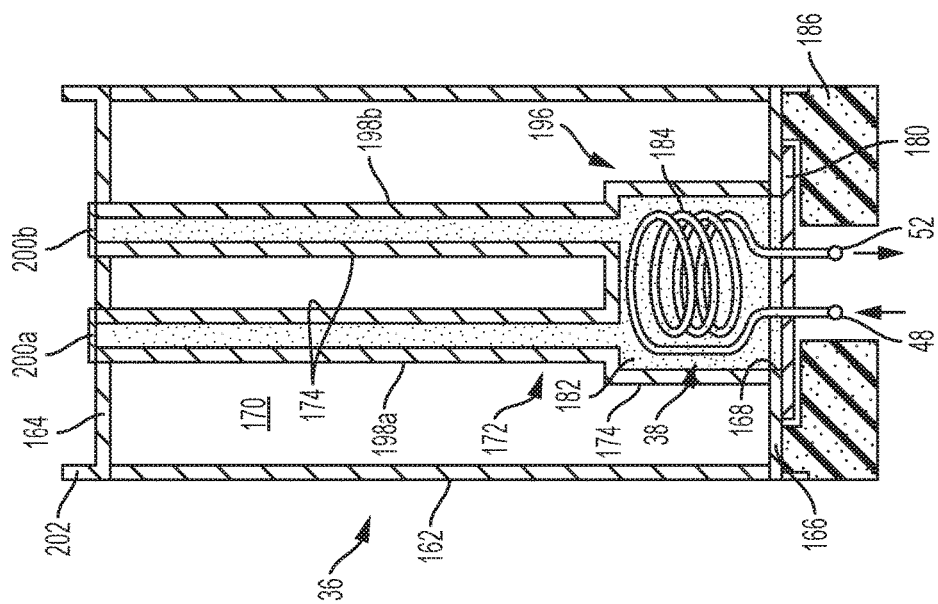
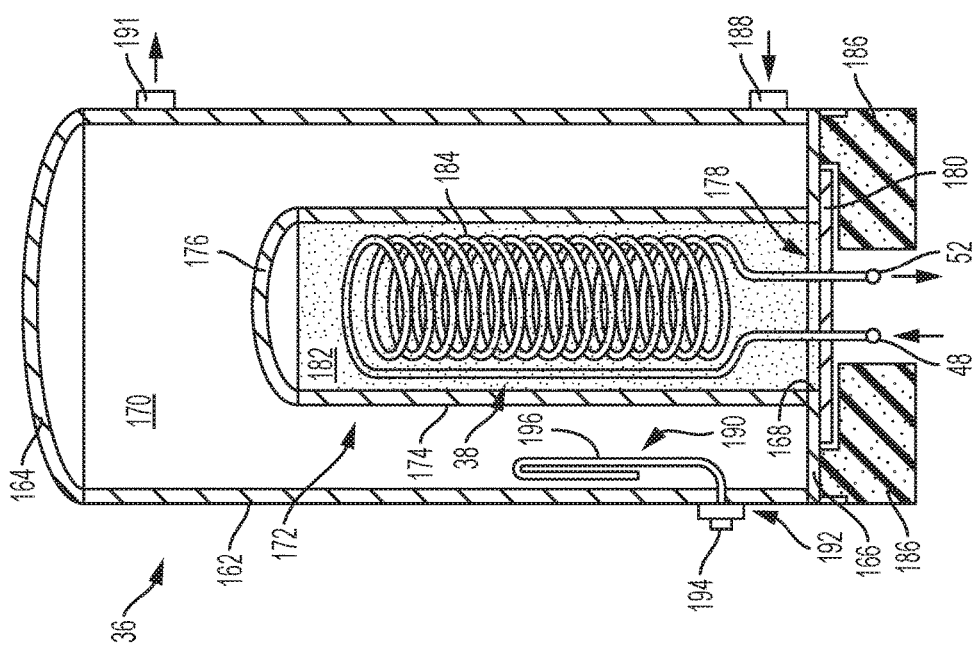

APPARATUS AND METHODS FOR HEATING WATER WITH REFRIGERANT AND PHASE CHANGE MATERIAL

BACKGROUND OF THE PRESENT INVENTION

Various apparatus and methods have been previously proposed for pre-heating water in a water heater tank using refrigerant from air conditioning apparatus such as an air conditioner with a non-reversible refrigerant circuit or a heat pump having a reversible refrigerant circuit.

SUMMARY OF THE INVENTION

In an embodiment of the present invention of an apparatus for heating water, a first tank defines a first inner volume for storing water. At least one second tank defines a second inner volume that is adjacent the first inner volume so that heat transfers between the first inner volume and the second inner volume. The second inner volume is isolated from water in the first inner volume. The second inner volume contains a phase change material. An air conditioning system has a refrigerant path that passes through the second inner volume. The phase change material surrounds the refrigerant path over a majority of its length within the second inner volume.

In another embodiment of the present invention of an apparatus for heating water, a first tank for storing water defines a first inner volume for storing water and has a heat source in operative communication with the first inner volume so that the heat source contributes heat to water in the first inner volume. At least one second tank extends within the first tank and defines a second inner volume that is adjacent the first inner volume so that heat transfers between the first inner volume and the second inner volume. The second inner volume is isolated from water in the first inner volume. The second inner volume contains a phase change material. An air conditioning system has an air handler actuatable to move an air flow through an air flow path into a conditioned space, a refrigerant path that passes through the air flow path and that passes through the second inner volume, a pump disposed in the refrigerant path and being actuatable to move refrigerant through the refrigerant path, and refrigerant that flows through the refrigerant path responsively to the pump. The phase change material surrounds the refrigerant path over a majority of its length within the second inner volume.

In a still further embodiment of the present invention of an apparatus for heating water, a first tank defines a first inner volume within the tank for storing water. At least one second tank surrounds an exterior of the first tank and defines a second inner volume adjacent to the first inner volume so that heat transfers from the first inner volume and the second inner volume. The second inner volume is isolated from water in the first volume. The second volume contains a phase change material. An air conditioning system has a refrigerant path that passes through the second inner volume. The phase change material surrounds the refrigerant path over a majority of its length within the second inner volume.

In another embodiment of the present invention of an apparatus for heating water, a first tank defines a first inner volume for storing water. At least one second tank defines a second inner volume that is adjacent the first inner volume so that heat transfers between the first inner volume and the second inner volume. The second inner volume is isolated from water in the first inner volume. The second inner volume contains a phase change material. A conduit passes through the second inner volume and extends outward of both the first tank and the second tank. The phase change material surrounds the conduit over a majority of its length within the second inner volume.

In a further embodiment of the present invention of a method for heating water, a first tank is provided that defines a first inner volume for storing water. At least one second tank is provided that defines a second inner volume that is adjacent the first inner volume so that heat transfers between the first inner volume and the second inner volume, wherein the second inner volume is isolated from water in the first inner volume, and wherein the second inner volume contains a phase change material. An air conditioning system is provided that has a refrigerant path that passes through the second inner volume, wherein the phase change material surrounds the refrigerant path over a majority of its length within the second inner volume. Refrigerant is moved through the refrigerant path, including through the second inner volume.

The accompanying drawings, which are incorporated in and constitute a part of this specification, illustrate one or more embodiments of the present invention.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which:

FIG. 14 is a schematic diagram of a water heater and heat exchanger according to an embodiment of the present invention, as used in the embodiments of FIGS. 1, 4, and 8;

FIG. 15 is a schematic diagram of a water heater and heat exchanger according to an embodiment of the present invention, as used in the embodiments of FIGS. 1, 4, and 8;

Figure 1:
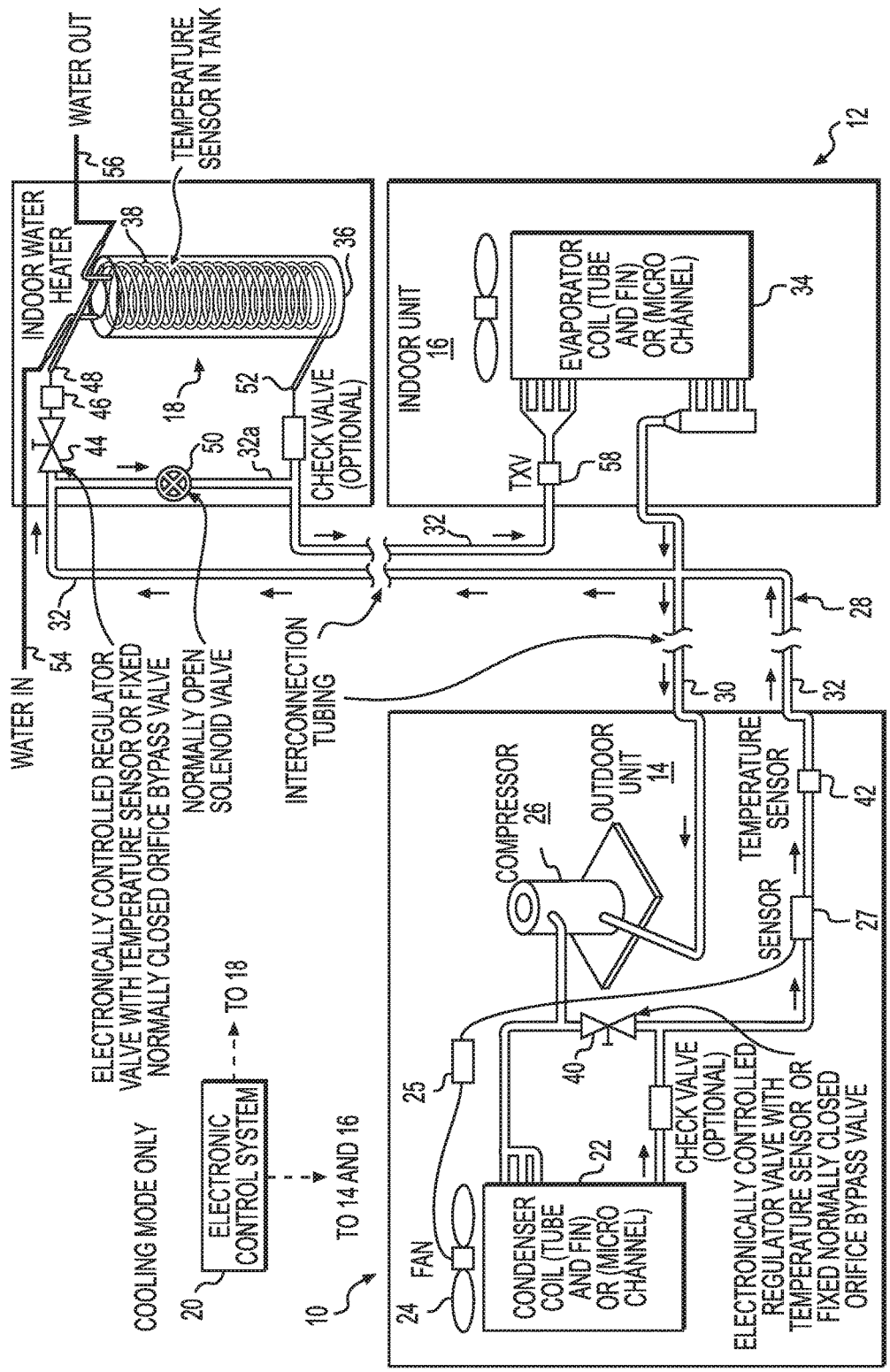
FIG. 1 is a schematic view of an air conditioning system according to an embodiment of the present invention, with an air conditioning system providing only conditioned space air conditioning.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and there equivalents.

As used herein, the terms "air conditioning" apparatus, system, etc. encompass apparatus useable to change the temperature of air being delivered to a conditioned space and having an associated refrigerant circuit. Thus, an "air conditioning" apparatus or system may comprise, without limitation, (1) an air conditioning unit (or "air conditioner") having a non-reversible refrigerant circuit that may be used to cool air delivered to a conditioned space, or (2) a heat pump having a reversible refrigerant circuit that may be used to heat or cool air delivered to a conditioned space.

As used herein, terms referring to a direction, or a position relative to the orientation of the water heater, such as but not limited to "vertical," "horizontal," "upper," "lower," "above," or "below," refer to directions and relative positions with respect to the water heater's orientation in its normal intended operation, as indicated in FIGS. 14 through 17 herein. Thus, for instance, the terms "vertical" and "upper" refer to the vertical orientation and relative upper position in the perspective of FIGS. 14 through 17, and should be understood in that context, even with respect to a water heater that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Residential and commercial air conditioning systems capture heat at some point in the refrigerant's continuous cycle and transfer the heat to a point inside or outside the building, depending upon whether the system is functioning in a cooling mode or, if capable of dual modes, in a heating mode. In carrying out principles of one or more embodiments of the present invention, a portion of that heat may be captured and used to heat water in the building's water heater. An electric element or gas burner in the water heater may provide additional heat to bring the water temperature up to the water heater's high set point temperature. An air conditioning system having a refrigerant path that contributes heat to a water heater is described in U.S. application Ser. No. 14/210,383, filed Mar. 13, 2014 and entitled Apparatus and Methods for Heating Water with Refrigerant from Air Conditioning System, and published as U.S. Publication 2014/0260392, the entire disclosure of which is incorporated herein for all purposes.

Figure 2:
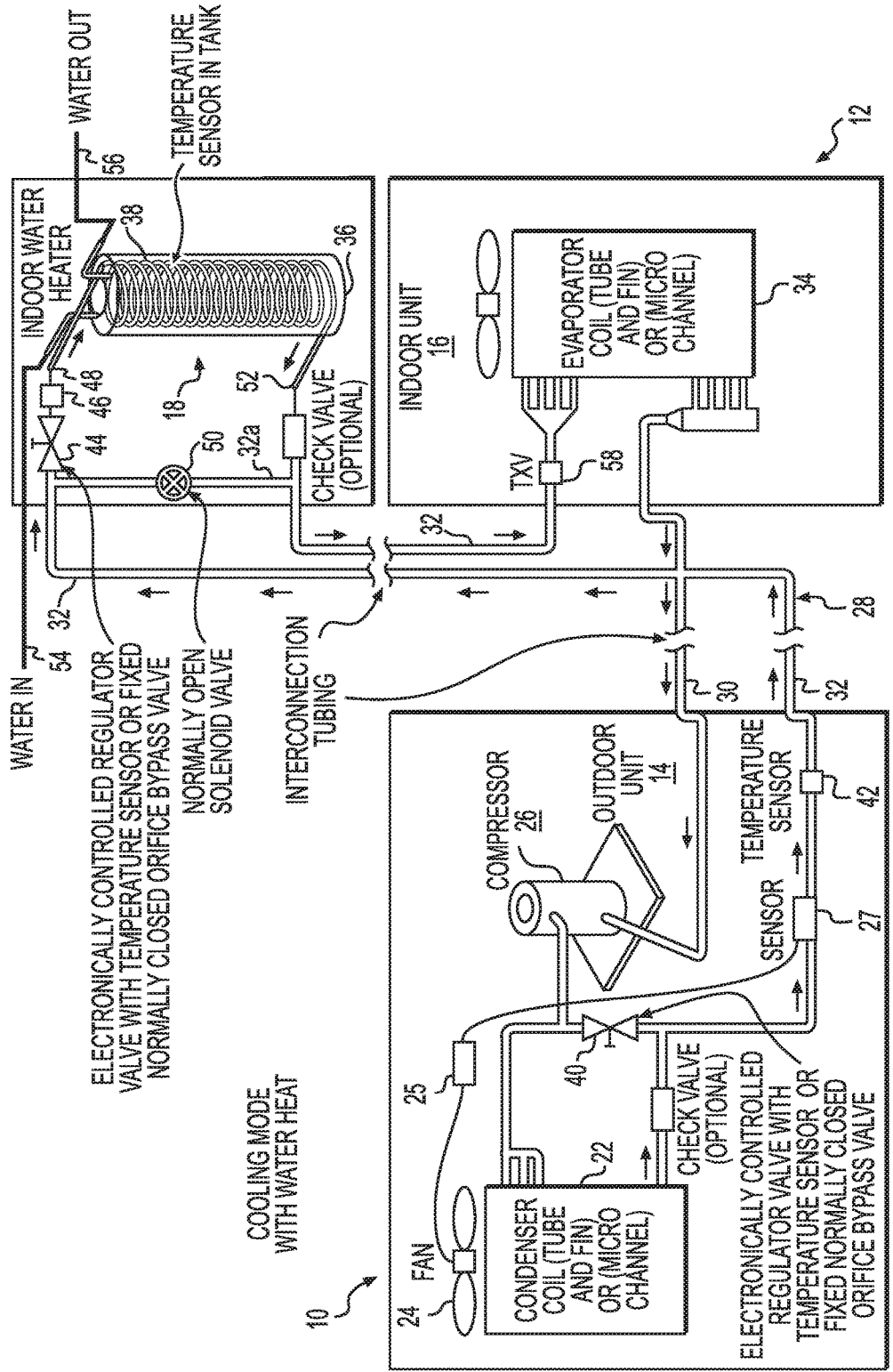
FIG. 2 is a schematic diagram of the system as in FIG. 1, but with the air conditioning system providing conditioned space air and providing refrigerant heat to a water heater.

An air conditioning/water heater system 10 embodying principles of an embodiment of the present invention is schematically depicted in FIGS. 1 and 2 and includes (1) an air conditioning system 12 having an outdoor condensing coil unit 14 and an indoor evaporating coil unit 16, and (2) an associated water heater 18 which, representatively, may be a gas-fired or electric water heater. In FIG. 1, air conditioning system 12 is arranged so that it operates in an air cooling mode only, and in FIG. 2 is in an air cooling mode and further provides supplemental, refrigerant-based heat to water heater 18. The various functions of air conditioning/water heater system 10 are controlled by a schematically depicted electronic control circuit 20 (shown only in FIG. 1) that operates various subsequently described components of the overall system 10.

As should be understood, an air conditioning system, from the standpoint of refrigerant flow, comprises a closed loop of refrigerant flowing among a compressor (i.e. a pump), a condenser coil, and an evaporator coil. In so-called split systems, one of the two coils is disposed inside the enclosure that is receiving conditioned air (the conditioned space, e.g. a building interior space), in association with an air handler, while the other coil is disposed outside the enclosure of the conditioned space, in the ambient environment. The compressor may be inside or outside the enclosure, such as a building interior, but is typically outside in a housing that also encloses the outside coil. In a system configured only to cool, the outdoor coil is the condenser, and the indoor coil is an evaporator. Refrigerant flows from the compressor, to the outdoor condenser coil, to the indoor evaporator coil, and back to the compressor. The outdoor unit includes a fan that draws ambient air across the condenser coils to draw heat from the coils. As will be understood, the refrigerant acquires this heat in part from the indoor air at the evaporator as the liquid refrigerant evaporates in the coil in response to the influence of an expansion valve at the coil's input. As the system's air handler fan moves the building's recirculating air over the evaporator coils as the refrigerant changes phase from liquid to gas, the refrigerant removes energy (i.e. heat) from the indoor air, thereby cooling the air as it is forced back into the building's conditioned space. The warm refrigerant gas then flows from the evaporator coil to the compressor, which receives the gas and pumps it back to the condenser, adding pressure and heat. In embodiments in which the air conditioning system operates as a heat pump, refrigerant lines between the compressor and the condenser, and between the compressor and the evaporator, pass through a reversing valve so that, when switching from cooling mode to a heating mode, the control system actuates the reversing valve to direct the compressor output to the indoor coil, rather than to the outdoor coil. The roles of the indoor and outdoor coils reverse from those the coils have in air cooling modes, but the sequence of compressor-condenser-evaporator-compressor remains.

As noted, the condenser cools the refrigerant, thereby dissipating the refrigerant's acquired heat (from the evaporator and the compressor) to the ambient environment via the air flow that the fan moves over the coil. The temperature reduction in the condenser also reduces the refrigerant's volume, in turn reducing its pressure, but the refrigerant flow path length and tubing dimensions, and the compressor's size and strength, are selected so that sufficient positive and negative pressure remain at the condenser's output and input to continue refrigerant flow to the evaporator and therefrom back to the compressor. The selection of such system components and operating parameters to enable desired heat transfer and recirculating refrigerant flow through the flow circuit should be well understood in this art. While it should be understood that the air conditioning systems described below are designed to provide sufficient heat transfer and pressure to maintain system operation, these variables are not discussed further herein.

One or more embodiments of the present invention described herein insert into the refrigerant path a cooling coil that extends within a water heater tank so that the coil is in thermal communication with water within the tank via a phase change material (PCM) to thereby transfer heat from the flowing refrigerant to the water. The addition of the cooling coil does not disrupt the air conditioning system's underlying compressor-condenser (other than the water heater cooling coil)-evaporator-compressor sequence, but it is nonetheless encompassed within the present disclosure to use a single coil system within a water heater tank that functions both as the heat exchanger and the air conditioning system condenser, in conditions where the heat exchanger provides sufficient cooling for the air conditioning system's condenser needs and where the air conditioning system does not require air flow over the condenser. Thus, although the present disclosure primarily discusses examples having a fan-driven system condenser and a distinct water heater heat transfer coil system, it should be understood that other arrangements fall within the present disclosure. Conversely, it is also encompassed by the present disclosure to operate the system so that the refrigerant flow is the only source of heat to the water heater, i.e. so that the water heater water is heated by the refrigerant heat provided via the coil and the PCM, and the water heater has no electric heating element, gas burner, or other heat source. Such an arrangement may be practical, for example, in a system used in a warm climate, where use of the cooling system would be relatively consistent.

Although the presently-described embodiments are discussed in the context of split-type air conditioning systems, it should be understood that the present disclosure encompasses air conditioning systems in which the condenser and evaporator coils may be located in the same housing.

As described in U.S. Published Application No. 2014/0260392, the heat exchanger coil wrapped around the water heater tank of the '392 system contributes heat through the tank wall directly to the tank water. As should be understood, the water heater includes a control system that actuates an electrical heating assembly 190 or a gas burner as the primary heat source when a temperature sensor in communication with the water in volume 170 indicates that the water temperature falls to or below a low water temperature set point (i.e. threshold) and deactivates the primary heat source when the temperature sensor indicates the water has reached or exceeded a high water temperature set point. Because the system controls the water heater's operation so that the water, being always at a temperature between the low and high water temperature set points (e.g. 105-110° F. and 120° F.), remains always in the liquid phase (i.e. at a water temperature between 32° F. and 212° F.), the heat exchanger can only contribute sensible heat to the water, i.e. contribute energy to the water that changes the water's temperature without causing the water to change phase. This relationship can be expressed as:

Amount of heat contributed to water ($Q_{water}$)=sensible heat or $Q_{water}$=specific heat*mass*temperature change Assuming a water specific heat of 4.178 kJ/Kg° C., a temperature movement in water from 70° F. to 120° F. (or 21° C. to 49° C.), water density of 993 kg/m$^3$, and a water volume V(m$^3$), then $Q_{water}$ (J)=4.178(kJ/kg° C.)*V(m$^3$)*993(kg/m$^3$)*(49−21)(° C.)

or $Q_{water}$ (kJ)=116,165*V(m$^3$)

This relationship also applies to sensible heat contributed to the PCM.

The refrigerant flows through the refrigerant path at a temperature of approximately 220° F. in certain embodiments, and in certain embodiments generally always above the water heater's high set point temperature. Because the refrigerant temperature is therefore always above the water heater water temperature, refrigerant flowing though the heat exchanger always has the capacity to contribute energy to the water, but because the water is always in the liquid phase during system operation (i.e. the refrigerant can only contribute sensible heat to the water), the water may not have the capacity to accept and store as much heat from the refrigerant flow as may be desired. Accordingly, certain embodiments as described herein encase the heat exchanger coil in a phase change material (PCM). The water/PCM combination has a greater capacity than water alone to receive and store heat from the refrigerant at the temperatures of the refrigerant and the water that occur during the air conditioning system's and water heater's normal operation.

In the described embodiments, the PCM surrounds the refrigerant path over some length of the refrigerant path through the heat exchanger, for example at least 50% of the refrigerant path's length over its overall length in which the refrigerant path is capable of contributing energy to the water tank or, in other embodiments, at least 75% of its length or at least 90% of its length in the heat exchanger. It will be understood from the present disclosure that the description herein that the PCM surrounds the refrigerant path or coil section means that the phase change material completely encases the coil's otherwise exposed surface areas. Where the refrigerant path is a refrigerant conduit arranged in a coil, therefore, this refers to the phase change material completely encasing the coil's outer surface, or surrounding the conduit in directions perpendicular or radial to the refrigerant flow, rather than to a complete spherical encasing. As described below, this generally means that the refrigerant coil is offset from the PCM container wall that separates the PCM volume from the water volume. In this way, the refrigerant coil contributes heat more effectively to the water via the PCM as a heat storage device, rather than directly to the water via the container wall. As indicated above, however, the present disclosure does not preclude all contact between the refrigerant coil and the inner container, or tank, wall, and it is specifically encompassed to have part of the refrigerant coil contact the inner volume (PCM volume) wall and the remaining part of the coil be surrounded by PCM, as indicated above. For example, such embodiments may be advantageous for use with warmer refrigerants, such as $CO_2$. Where PCM exists between the wall and the refrigerant coil, the amount in one embodiment should be enough so that the coil remains offset from the wall even when the PCM is in liquid phase.

In certain embodiments, the PCM's phase change temperature is at or slightly above the water heater's high water set point temperature during the water heater's normal operation, and because the expected refrigerant temperature is above the PCM's phase change temperature, it is possible for the refrigerant to contribute to the PCM not only sensible heat, but also latent heat, or energy contributed to the PCM during the PCM's phase change. The amount of latent heat added to a material when the material's temperature crosses a phase change temperature for that material may be described as the material's density*its volume*its latent heat capacity. Assuming the sensible heat relationship described above, that the total volume of water and phase change material is $V(m^3)$, that the volume of water within volume V is $V_w(m^3)$ that the PCM is stearic acid, that the latent heat capacity of stearic acid is 199 kJ/kg, that the specific heat of stearic acid is 2.359 kJ/kg° C., that the density of stearic acid is 847 kg/m$^3$, and that the water volume and stearic acid temperatures will be moved from 70° F. to 120° F. (or 21° C. to 49° C.):

$Q_{total}$ = sensible heat added (water) + latent heat added (PCM) + sensible heat added (PCM)

or $Q_{total}$ (kJ) = 116,165 * $V_w$(m$^3$) + (V − $V_w$)(m$^3$) * 847 (kg/m$^3$) * 199 (kJ/g) +

2.359 (kJ/kg ° C.) * (V − $V_w$)(m$^3$) * 847 (kg/m$^3$) * (49 − 21) (° C.)

or $Q_{total}$ (kJ) = 116,164 * $V_w$(m$^3$) (kJ) +

168,553 * (V − $V_w$)(m$^3$) (kJ) + 55,946 * (V − $V_w$)(m$^3$) (kJ)

or $Q_{total}$ (kJ) = 224,499 * V(m$^3$) − 108,334 * $V_w$(m$^3$) (kJ)

If, for example, the total volume of water in a water heater tank not having a PCM volume is 0.192 cubic meters, then in the example above, the amount of heat (sensible) contributed to the water is 116,165*0.192=22,303 kJ. If, however, the same tank has a PCM container as described herein, where the total volume of PCM and tank water is 0.192 cubic meters and where the volume of water within that total volume is 0.144 cubic meters, then the sensible heat contributed to the water is 16,728 kJ, the sensible heat contributed to the PCM is 8091 kJ, and the latent heat contributed to the PCM is 2685 kJ, for a total heat contribution of 27,504 kJ, or an approximately 22% increase in heat contributed by the refrigerant when utilizing the PCM as compared to heat contributed by the refrigerant without the PCM as described above. The present disclosure further discusses relationships, when using PCM to displace water in a water heating system, between loss of water capacity and gains in heat capacity below with respect to FIG. 21.

Assuming the coil is encased in PCM and does not directly touch the interior side of wall 174, the PCM contributes heat directly to the PCM, which in turn contributes heat to the water through wall 174. Thus, the example above describes the net heat acquired by the PCM from the refrigerant as the PCM and the water rise from 70° F. to 120° F.

As refrigerant flowing through the heat exchanger conduit at the target temperature, again for example, about 220° F., contributes heat to the PCM in the phase change material container within the water tank according to the heat equation described above, solid PCM in the area immediately surrounding the refrigerant coil heats toward its phase change temperature. Because the PCM's phase change temperature is below the refrigerant temperature, the refrigerant's continued flow through the heat exchanger brings that solid PCM to its phase change temperature, so that the refrigerant thereafter contributes latent heat to the PCM as some or all of the PCM changes phase from a solid to a liquid. After the PCM immediately about the coil changes phase, the conduit continues to contribute sensible heat to the now-liquid PCM, which in turn contributes heat to the solid PCM outward of the liquid material, causing further phase change, until possibly the entire amount of PCM in volume 182 changes phase. The refrigerant flow can then continue to contribute sensible heat to the PCM. The PCM, in turn, contributes heat to the water across the phase change material container wall. Once the heating call ends when the water temperature reaches its upper set point, so that the water heater control system deactivates the water heater's primary heating source and diverts refrigerant flow so that it bypasses the water heater, the water temperature begins to drop, but the increased heat held by the system slows the temperature drop, or in other words maintains the water within the desired temperature range for a longer period. In particular, when the water and PCM reach the temperature at which the PCM changes phase in the reverse direction, i.e. back from a liquid into a solid, the latent heat stored by the PCM becomes available to contribute to the water.

Phase change materials that may be used in the embodiments as described herein have a capacity to store latent heat and exhibit changes from one physical phase to another (e.g. from solid to liquid and from liquid to solid) at respective temperatures that are each between the water heater's low and high set point temperatures, or in certain embodiments at or slightly above the high set point temperature, or in other embodiments the solid-to-liquid change temperature (melt temperature) is at or slightly above the high set point temperature and the liquid-to-solid phase change temperature is below the high set point temperature, but the PCM phase change temperatures being below the refrigerant's expected temperature. Examples of phase change materials usable with these embodiments include stearic or other fatty acids, paraffin waxes, or salt hydrates, but it should be understood that other phase change materials having acceptable phase transition characteristics, and other characteristics such as desired chemical and biohazard characteristics, may be used.

As described herein, the use of a PCM with a solid-to-liquid (i.e. energy absorbing) phase change temperature at or slightly above the water heater's high set point temperature causes the PCM to contribute a significant amount of heat, i.e. as the PCM changes phase from liquid to solid (i.e. an energy contributing change), at or slightly below the water heater's high set point, thereby having a greater tendency to maintain the water heater's water at or near the high set point than is the case if the PCM phase change temperatures are at a lower level, although it is within the present disclosure to have the PCM phase change temperatures at a lower level. As will be understood from the present disclosure, the PCM continues to contribute heat to the water after it has changed phase to liquid, and thus continues to beneficially contribute stored heat to the water, but the location of the energy-contributing phase change at or about the water heater's high set point allows the PCM to contribute greater heat to the surrounding water when the water is near its high set point, thereby increasing the PCM's effectiveness in maintaining the water at or near the high set point temperature. It will also be understood that the phase change temperatures may be controlled and selected by mixture of the underlying PCM with other materials. Thus, it will be understood that, given a selected PCM, the PCM may be tuned to a given energy-contributing phase change temperature, for example at or about 120° F. Generally, the phase change temperature will be set at or slightly above or below the water heater's high set point temperature, which may be 120° F. and generally between 105° F. and 125° F., but in certain embodiments not below 105° F. and not above 135° F. As such processes and mixtures for establishing a PCM's phase change temperature are understood, they are not described in further detail herein, though it should be understood that when a PCM is mixed to tune its phase change temperature, the "PCM" should be understood to include the mixed material(s).

Phase change materials may also be chosen based on characteristics other than or in addition to phase change, or transition, temperature. For example, the phase change material's ability to receive and store heat is directly proportional to its latent heat capacity, as indicated in the example above, and PCM may also be selected on this basis or in reliance on latent heat capacity as a factor. Further, in some applications, it may be desirable that the PCM be non-corrosive to certain system components or components or materials in the system's environment. In such instances, for example, salt hydrates may not be desirable, while in other applications they may be desirable. Still further, in some applications it may be desirable to minimize a divergence of the PCM's solid-to-liquid phase change temperature from its liquid-to-solid phase change temperature, with the latter being lower than the former, which can be referred to as "sub-cooling," in that the transition temperature in the cooling direction is lower than the transition temperature in the heating direction. In such instances, a PCM may be selected that has a low sub-cooling characteristic or a PCM may be blended to that result.

Referring now to FIGS. 14 through 18, water heater 36 includes a vertically oriented, generally cylindrical tank defined by a body side wall 162 having a generally circular cross section, a domed top head portion 164, and a flat bottom wall 166. Bottom wall 166 is annular, with a circular through-bore 168 defined in the center thereof. Side body wall 162, top wall 164, and bottom wall 166 generally define an interior volume 170 for storing water therein. Wall 162, head 164, and floor plate 166 may be formed from materials common to the construction of water heaters, for example a carbon steel outer wall layer with a glass or porcelain enamel inner surface, or uncoated stainless steel. It should be understood, however, that the tank structures may be formed in various other suitable arrangements, for example from polymer materials and in single or double wall formations, and that the presently described embodiments are not limited to a particular form of tank wall structure or geometry.

A generally cylindrical interior tank 172 extends into the water heater's water tank through center bore 168 of tank bottom wall 166 so that tank water volume 170 surrounds interior tank 172 and an inner volume defined by interior tank 172 is adjacent water tank volume 170 across the walls of interior tank 172. Tank 172 has a cylindrical sidewall 174, a domed head 176 and a bottom opening 178 that is closed by a disk-shaped plate 180 bolted to bottom tank plate 166, and a sealant or O-ring seal may be provided between plates 166 and 180 to complete a fluid-tight interior volume. Sidewall 174 and domed head 176 are formed from glass or porcelain enamel coated steel, uncoated stainless steel, a structural polymer such as a glass-filled polypropylene, or other suitable material in a structure that isolates an inner tank interior volume 182 from water heater tank interior volume 170. One or more struts (not shown) may be provided between wall 162 and wall 174 and/or 176 to provide further stabilization of interior tank 172. Interior volume 170 is isolated from interior volume 182 in that the structure of inner tank 172 is formed, and sealed from interior volume 170, so that potable water in volume 170 does not cross into inner tank interior volume 182, and phase change material within inner tank interior volume 182 does not cross the boundary formed by the structure of tank 172 into the water stored in water heater tank volume 170.

A refrigerant conduit 184 passes through two sealed bushings (not shown) extending through floor plate 180 to thereby extend into interior volume 182 and form the coil of heat exchanger coil 38 between refrigerant inlet 48 and refrigerant outlet 52. In the presently described embodiments, conduit 184 is made of copper or aluminum but should be understood to be constructed of any suitable material. While the figures illustrate that refrigerant conduit 184 is coiled, this is an embodiment only, and the conduit may be arranged in any geometry that provides a desired conduit surface area by which to conduct heat. Inner volume 182 is filled with stearic or other fatty acid, paraffin wax, salt hydrate, or other phase change material that is capable of storing latent heat as described above, except for a portion of the volume at the top of volume 182 sufficient to accommodate volume changes in the PCM as it changes phase.

Water heater tank wall 162 and phase change material tank wall 172 are generally cylindrical in that each structure is elongated in its axial direction and that the dimension of the volume enclosed by each structure in the axial direction is greater than the volume's diameter. In the illustrated embodiment, the central axis of tank wall 162 is collinear with the central axis of wall 174 and the coil of heat exchanger 38, although it should be understood that such collinear relationships are not required. The conduit that forms the heat exchanger is entirely disposed radially inward from the inner surface of wall 174 and below the domed wall 176. Being that the stearic acid or other PCM fills chamber 182, the PCM surrounds heat exchanger coil 38 through the coil's entire extension in volume 182 and more than 90% of its length between inlet 48 and outlet 52, although as noted above the percentage of PCM coverage of the refrigerant line can be greater than or less than 90%, e.g. up to 100%.

The water heater body rests upon stands 186, which may be constructed of foam or other suitable material. It should also be understood that any other suitable support structure may be utilized, for example including structural members formed integrally with side wall 162 and/or bottom wall 166.

A cold water inlet fitting 188, a hot water outlet fitting 191, and a temperature and pressure release valve (not shown) extend through suitable openings defined in the water heater's side wall 162 and/or domed top head portion 164. A valve drain pipe (not shown) may extend inwardly through bottom plate 166, as should be understood in this art. An electric resistant heating assembly 190 extends radially inwardly into interior volume 170 through an aperture 192 in side wall 162. Assembly 190 includes an electrical fitting 194 that extends outwardly from side wall 162. A power source provides electric current to a heating element 196 of assembly 190 via electrical fitting 194, and a control board (not shown) controls the application of power to the heating element from the power source in response to a temperature sensor (not shown) that senses the temperature of water in volume 170, as described herein. Heating element 196 extends radially inward from tank wall 162 and electrical fitting 194 toward PCM container 172 and makes a ninety degree turn so that a portion of the heating element extends parallel to the surface of side wall 174, thereby accommodating the phase change material tank within volume 170. A second heating element may also be installed at an upper part of tank wall 162, so that water is heated at the upper and lower parts of volume 170 simultaneously. If the upper heating assembly is disposed in tank wall 162 sufficiently high to clear the top of inner tank 172, the heating element may extend horizontally (in the perspective of FIG. 14) into the tank volume. It should be understood, however, that single-element and double-element configurations may be utilized.

To fill volume 182, water heater 36 is constructed as shown, except for plate 180, so that access to interior volume 182 is available through bore 168. Water heater 36 is turned upside-down, the PCM is inserted into volume 182 through bore 168, plate 180 is bolted to the heater bottom, and the water heater is righted and placed on blocks 186.

FIG. 15 illustrates a further embodiment of the present invention, in which a phase change tank volume is adjacent the water tank inner volume. Water heater 36 again includes a generally cylindrical side wall 162 and an annular bottom plate/wall 166 defining an opening 168 that is closed by flange plate 180 through which refrigerant conduit forming heat exchanger 38 and coil 184 passes via sealed bushings in plate 180, between refrigerant entry point 48 and exit point 52. Phase change container, or tank, 172 comprises a generally cylindrical base portion 196 and multiple (only two shown in FIG. 15) parallel generally cylindrical portions 198a and 198b extending from the top of generally cylindrical portion 196 through the upper portion of tank inner volume 170 to upper wall plate 164. Wall 174 defines each of portions 196, 198a, and 198b so that these three portions define a continuous volume 182 that encloses the phase change material. Moreover, wall 174 is continuous, and meets bottom plate 166 and top plate 164 at sealed connections so that volume 170 and volume 182 are isolated from each other, as discussed above with respect to FIG. 14. Seal plates 200a and 200b close and seal the open ends of tube-like cylindrical portions 198a and 198b on the upper side of plate 164. The seal plates may be removable, for example through a threaded engagement with tube-like sections 198a and 198b, to allow volume 182 to be filled with phase change material at the water tank's upper end. In contrast to the domed shape of top plate 164 in the embodiment of FIG. 14, plate 164 in the embodiment of FIG. 15 is generally planar, though a removable domed cap 202 may be disposed over plate 164, or plate 164 and domed cap 202 may be formed integrally with each other and secured to side wall 162. A sufficient number of tube-like cylindrical sections are provided, in sufficient diameter, so that the arrangement of FIG. 15 defines a greater surface area of phase change material container 172 than in the embodiment of FIG. 14, thereby providing a greater path for heat transfer between the phase change material in volume 182 and water in volume 170. In addition, stability struts may be unnecessary in this arrangement due to the engagement of tube-like sections 198a and 198b (and others) in corresponding bores in top plate 164. In the illustrated embodiment, coil 184 is contained entirely within lower chamber portion 196, but in other embodiments the conduit may extend at least partly into one or both of section 198a and 198b.

Although not shown in FIG. 15, water heater 36 may include a heating element assembly at the lower part of the tank, similar to the embodiment shown in FIG. 14. As in the earlier embodiment, the heating element may bend and extend vertically, to avoid the inner PCM tank. As with the earlier embodiment, this embodiment may also include a second heating element assembly, but since the inner PCM tank extends the entire vertical length in the FIG. 15 embodiment, the upper heating element may also bend to a vertical alignment in parallel with the PCM tank longitudinal axis/axes.

Figure 16:
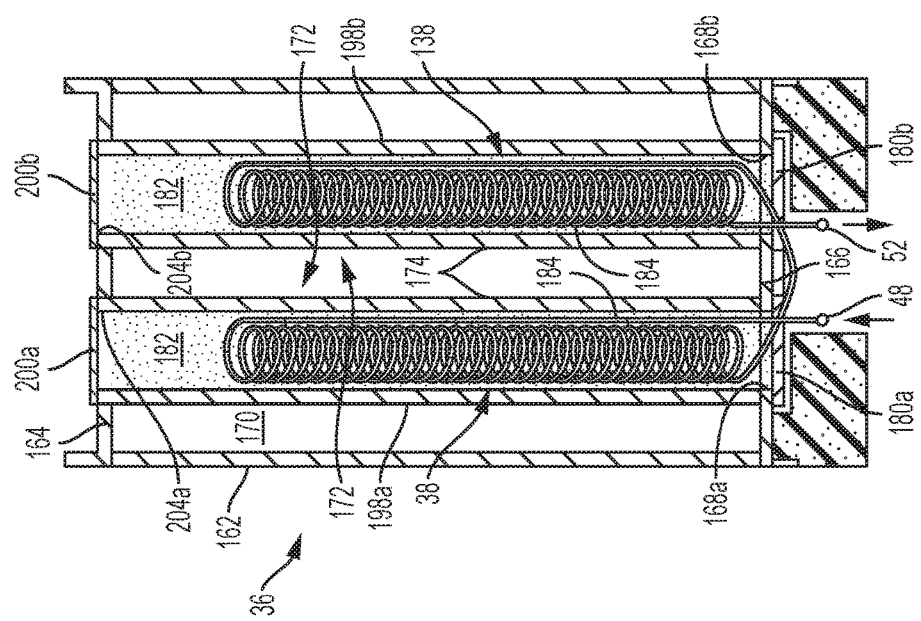
FIG. 16 is a schematic diagram of a water heater and heat exchanger according to an embodiment of the present invention, as used in the embodiments of FIGS. 1, 4, and 8.

In an embodiment illustrated in FIG. 16, water heater 36 again includes a tank having generally cylindrical body 162, a generally planar top plate 164, and a generally planar bottom plate 166. Phase change material container 172 again defines an inner volume adjacent the inner water heater tank volume and is comprised of two (or more) discrete generally cylindrical, tube-like portions 198a and 198b that extend through tank interior volume 170 between respective holes 168a and 168b in bottom plate 166 and respective holes 204a and 204b in planar top plate 164. The diameter of each of tubes 198a and 198b is smaller than the diameter of tank wall 162, so that water in volume 170 completely encloses each of portions 198a and 198b. The lower open ends of sections 198a and 198b are capped by respective end plates 180a and 180b, whereas the open top ends are closed by respective top plates 200a and 200b. PCM container wall 174 is continuous over each of portions 198a and 198b, and engages plate holes 168a, 168b, 204a, and 204b at sealed connections so that PCM container inner volume 182 is isolated from water tank inner volume 170. Top plates 200a and 200b may removably (e.g. threadedly) engage the open top ends of portions 198a and 198b so that the respective container portions may be filled from the top portion of the tank. Refrigerant conduit forms two coils 184 that extend between refrigerant entry point 48 and refrigerant exit point 52 of heat exchanger 138, defining respective coils in the portions 198a and 198b. From entry point 48, the refrigerant coil extends through a sealed bushing (not shown) in bottom plate 180a, forms a coil within container portion 198a, exits that portion through a second sealed bushing (not shown) in plate 180a, and passes through a second set of sealed bushings (not shown) in plate 180b to form a similar coil in portion 198b before reaching exit point 52. Provided there are a sufficient number of tubes, the embodiment of FIG. 16 provides an increased surface area for heat conduction, similar to that of the embodiment of FIG. 15, but also provides the more direct interaction between coils 184 and the phase change material, as in the embodiment of FIG. 14. In an alternate arrangement, the respective coils in tube portions 198a and 198b are not part of the same refrigerant path but are instead parts of separate refrigerant paths, each being part of a separate air conditioning system with its own compressor, evaporator, and condenser, as discussed above.

Although not shown in FIG. 16, water heater 36 may include a heating element assembly at the lower part of the tank, similar to the embodiment shown in FIG. 14 and discussed with respect to FIG. 15. As in the earlier embodiments, the heating element may bend and extend vertically, to avoid the inner PCM tank. This embodiment may also include a second heating element assembly, also having a heating element that bends from a horizontal to a vertical alignment in parallel with the PCM tank longitudinal axis/axes.

Figure 17:
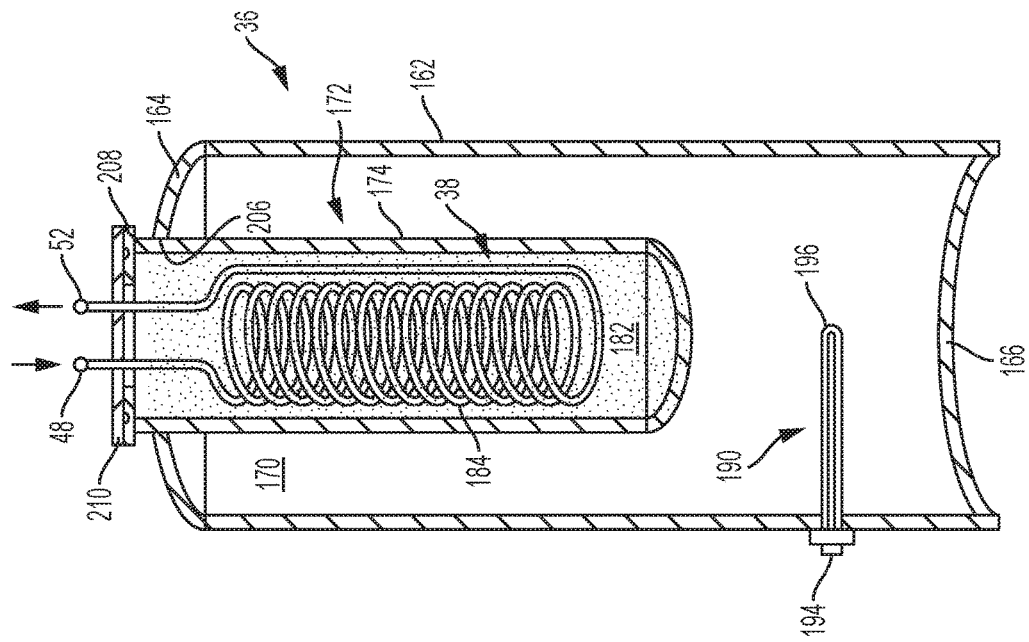
FIG. 17 is a schematic diagram of a water heater and heat exchanger according to an embodiment of the present invention, as used in the embodiments of FIGS. 1, 4, and 8.

In the embodiment illustrated in FIG. 17, water tank 36 again includes a tank having generally cylindrical side wall 162 and a domed top wall 164 that, along with bottom wall 166, define an interior volume 170. In this embodiment, phase change material container, or tank, 172 extends into the water heater tank from the top, through a circular bore 206 formed through top of top plate 164, but again the two volumes are adjacent each other via the phase change material tank walls. Side wall 174 may be secured into bore 206 via a threaded or other sealed connection between side wall 174 and top plate 164. An open top end of generally cylindrical tube-like side wall 174 ends at an integrally formed flange 208 having a central bore therethrough to allow the entry of PCM to volume 182. A removable top flange 210 sealingly secures to bottom flange 208 to sealingly close internal volume 182 of PCM container 172. The refrigerant conduit extends between refrigerant entry point 48 and refrigerant exit point 52, forming refrigerant coil 184 therebetween. With top plate 208 removed, refrigerant can be disposed within container 172 so that it completely encloses the refrigerant that forms coil 184 over more than 90% of its length between points 48 and 52. The conduit extends through sealed bushings (not shown) through top plate 210. The arrangement illustrated in FIG. 17 provides an advantage of a top-fillable container and allows use of a heating assembly 190 having a horizontally-aligned heating element 196, as shown. Struts (not shown) may be provided to further stabilize the PCM container, for example from bottom wall 166 to the bottom-facing portion of the PCM tank.

A second heating element may be provided at the top of the tank, extending through tank side wall 162. The heating element may bend from a horizontal to a vertical (up or down) alignment, parallel with the axis of inner tank 172, to avoid contact with the inner tank wall. In a still further embodiment, the electrical heating element assembly(ies) is/are omitted, and a gas burner assembly is provided in a combustion chamber below bottom plate 166, with an exhaust gas flue routed about one side of interior tank 172 or through tank 172.

Figure 18:
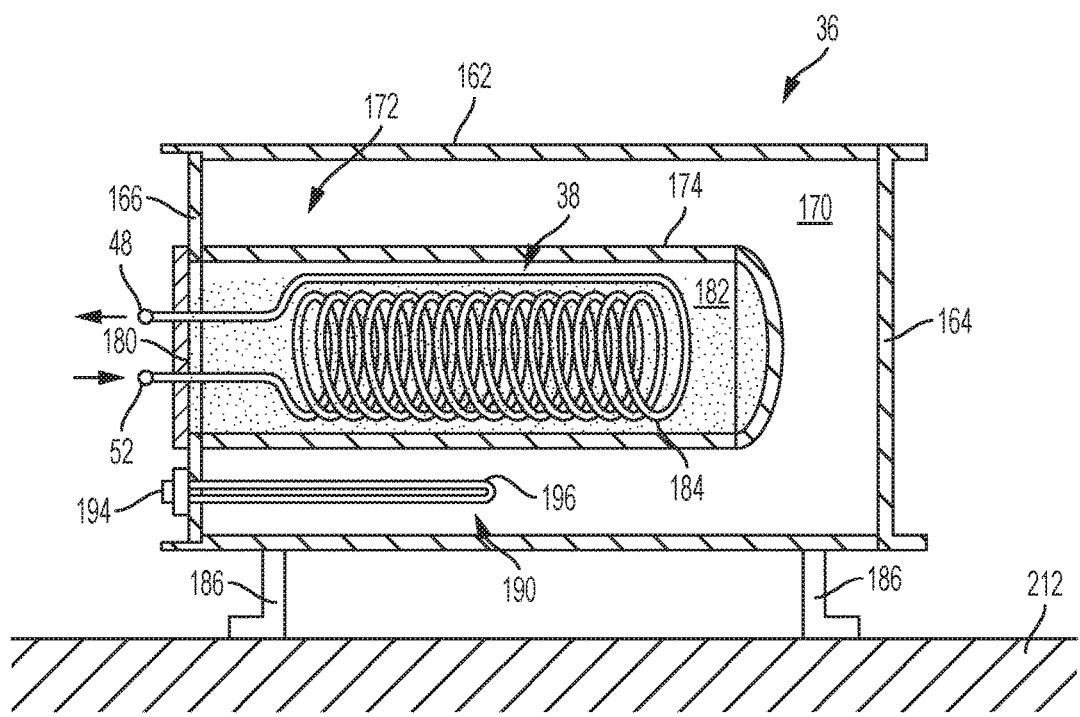
FIG. 18 is a schematic diagram of a water heater and heat exchanger according to an embodiment of the present invention, as used in the embodiments of FIGS. 1, 4, and 8.

FIG. 18 illustrates a further embodiment, also using a standard linear heating element assembly 190. Heater 36 again includes a tank having a generally cylindrical tank side wall 162, but in this embodiment the tank is aligned so that its longitudinal axis is parallel to a ground surface 212, so that its axis is horizontal with respect to the ground surface and in the context of the other Figures. PCM tank 172 is secured to and installed through bottom plate 166, as described above with respect to FIG. 14. One or more struts (not shown) may be provided between wall 162 and the distal end of interior tank 172. Heating element assembly 190 is also secured through a bore in plate 166 so that heating element 196 extends into volume 170 parallel to and below phase change material container 172. A pair of support legs 186 support side wall 162 on ground surface 212. It should be understood that the heating element may extend upward through the bottom walls of vertically-oriented tanks, such as those illustrated in FIGS. 14-17, particularly where the tanks are mounted at their side walls to a wall or post, such that the tank bottom is easily accessible.

Figure 19:
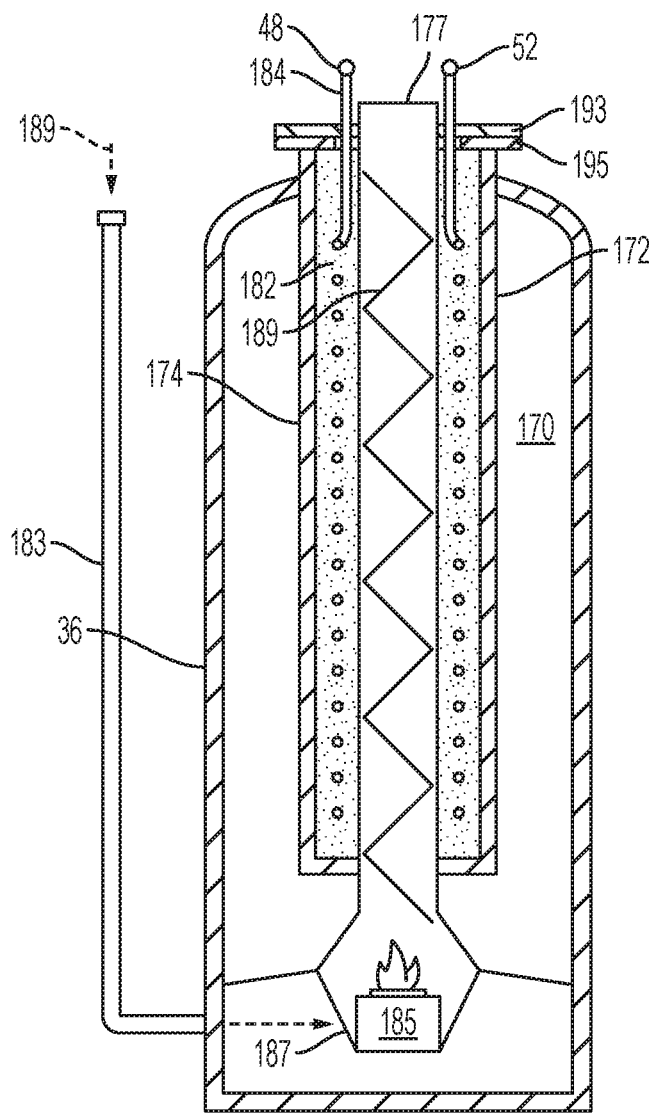
FIG. 19 is a schematic diagram of a water heater and heat exchanger according to an embodiment of the present invention, as used in the embodiments of FIGS. 1, 4, and 8.

In further embodiments, an example of which is illustrated in FIG. 19, a PCM container is utilized with a gas-fired water heater. The interior tank of the water heater shown in FIG. 19 is formed as a wall 174 having an open end 175 at the top thereof so that wall 174 ends at an integrally formed flange 195. A removable top flange 193 sealingly secures to bottom flange 195 to sealingly close internal volume 182 of PCM container 172. Flange 195 and top flange 193 define corresponding central bores that receive the flue 177 of a gas-fired water heater 36, the bore of top flange 193 doing so in a sealed engagement. The refrigerant conduit extends between refrigerant entry point 48 and refrigerant exit point 52, forming refrigerant coil 184 therebetween. With top flange 193 removed, refrigerant can be disposed within container 172 so that it completely encloses the refrigerant that forms coil 184 over more than 90% (or less than 90%) of its length between points 48 and 52. The conduit extends through sealed bushings (not shown) through top flange 193. A bottom bore 179 sealingly engages flue 177 to isolate interior volume 182 from water interior volume 170. Struts (not shown) between tanks 36 and 172 may stabilize tank 172 within tank 36.

An external gas line 183 provides gas to a burner 185 in a burner box 187 so that burner 185 ignites and the incoming gas to produce heat in burner box 187. Alternatively, burner 185 may be disposed in a discrete burner box that is disposed below a bottom wall of the water tank, through which the flue extends. Hot flue gas, indicated at 189, rises through flue 177 and across baffle fins 189, delivering heat to the wall of flue 177 through direct contact with the flue walls and through contact with baffles 189, which transmit heat to the flue wall. Thus, heat from the gas flue is delivered to the PCM in volume 182 in addition to heat from the refrigerant conduit.

Figure 20:
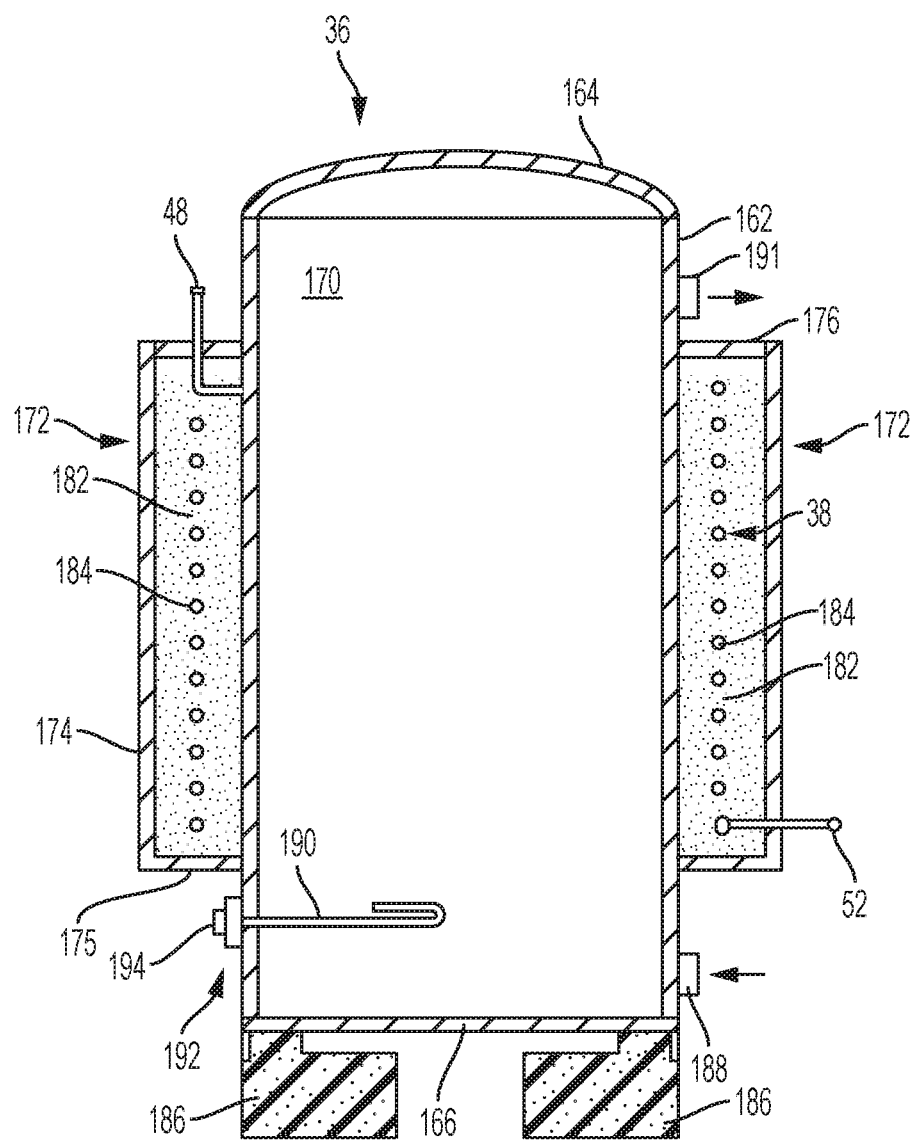
FIG. 20 is a schematic diagram of a water heater and heat exchanger according to an embodiment of the present invention, as used herein in the embodiments of FIGS. 1, 4, and 8.

In a still further embodiment, and referring to FIG. 20, heat exchanger 38 is formed as a coil wrapped around water heater 36. The heat exchanger is encased within a cylindrical outer wall that forms a tank defining an enclosed volume, for example so that the outer wall of tank 36 forms an inner surface of the outer tank. In this embodiment, the phase change tank inner volume is again adjacent the water heater tank inner volume, but in this embodiment is adjacent through the water heater tank wall rather than through the phase change material tank wall. The coil of heat exchanger 38 is offset from the tank's outer surface in the radial direction (with respect to the cylindrical tank's longitudinal axis), so that the phase change material within the enclosed volume entirely encloses the heat exchanger coils.

More specifically, water heater 36 includes a vertically oriented, generally cylindrical tank defined by a body side wall 162 having a generally circular cross section, a domed top head portion 164, and a flat bottom wall 166. Bottom wall 166 is continuous, without a circular through-bore. Side body wall 162, top wall 164, and bottom wall 166 generally define an interior volume 170 for storing water therein. A generally cylindrical exterior tank 172 extends about the water heater's water tank so that an interior volume 182 of exterior tank 172 surrounds tank water volume 170 and so that the exterior tank's inner volume 182 is adjacent water tank volume 170 across water tank wall 162. Tank 172 has a cylindrical sidewall 174, an annular bottom portion 175, and an annular top plate 176 that can be secured, for example by welding, rivets, adhesive, or other means, between wall 174 and wall 162 after PCM is inserted through the top opening filled by wall 176 into volume 182. Volume 170 is isolated from volume 182 in that the structure of exterior tank 172 is formed, and sealed from volume 170 by the structure of tank wall 162, so that potable water in volume 170 does not cross into volume 182 and phase change material within volume 182 does not cross the boundary formed by wall 162 into the water stored in water heater tank volume 170.

A refrigerant conduit 184 passes through two sealed bushings (not shown) extending through top wall 176 and bottom wall 175 to thereby extend into volume 182 and form the coil of heat exchanger coil 38 between refrigerant inlet 48 and refrigerant outlet 52. While FIG. 20 illustrates that refrigerant conduit 184 is coiled within volume 182, this is an embodiment only, and the conduit may be arranged in any geometry that provides a desired conduit surface area by which to conduct heat. Volume 182 is filled with stearic or other fatty acid, paraffin wax, salt hydrate, or other phase change material that is capable of storing latent heat as described above, except for a portion of the volume at the top of volume 182 sufficient to accommodate volume changes in the PCM as it changes phase.

The conduit that forms heat exchanger 38 is disposed radially outward from the outer surface of wall 162 that forms the inner surface of tank 172 and below top wall 176. Being that the stearic acid or other PCM fills volume 182, the PCM surrounds heat exchanger coil 38 through the coil's entire extension in volume 182 and more than 90% of its length between inlet 48 and outlet 52, although as noted above the percentage of PCM coverage of the refrigerant line can be greater than or less than 90%, for example up to 100%.

A cold water inlet fitting 188, a hot water outlet fitting 191, and a temperature and pressure release valve (not shown) extend through suitable openings defined in the water heater's sidewall 162 and/or top head portion 164. A valve drain pipe (not shown) may extend inwardly through bottom wall 166, as should be understood in this art. An electric resistant heating assembly 190 extends radially inward into tank interior volume 170 through an aperture 192 in sidewall 162. Assembly 190 includes an electrical fitting 194 that extends outwardly from sidewall 162. A power source provides electric current to a heating element 196 of assembly 190 via electrical fitting 194, and a control board (not shown) controls the application of power to the heating element from the power source in response to a temperature sensor (not shown) that senses the temperature of water in volume 170, as described herein. A second heating element may also be installed at an upper part of tank wall 162, so that water is heated at the upper and lower parts of volume 170 simultaneously. Furthermore, an embodiment such as illustrated in FIG. 20 may be utilized with gas-fired water heaters, such as discussed above with respect to FIG. 19.

Figure 21:
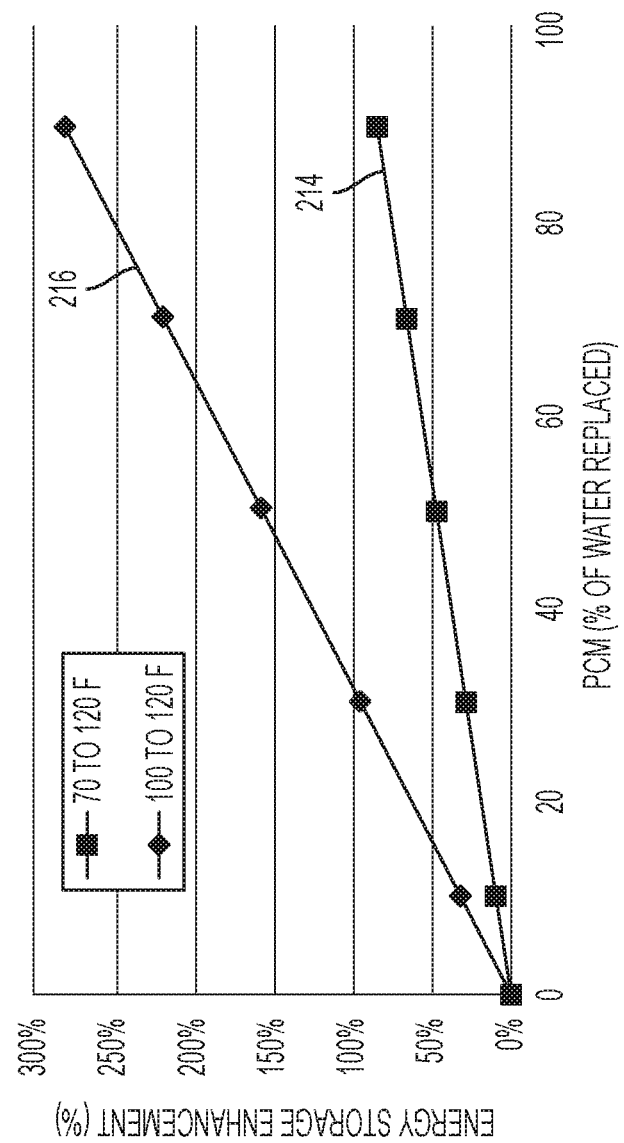
FIG. 21 is a graphical representation of energy storage enhancement as a function of displacement of water by a phase change material container in the water heaters as illustrated in FIGS. 14-19.

It will be apparent from the embodiments illustrated in FIGS. 14-20 that the phase change material container displaces a volume of water that would be present in inner volume 170 in the phase change material tank's absence. Because the phase change material is capable of storing a greater amount of heat than is the water, the arrangements described herein are capable of storing a greater amount of energy than a water-only water heater tank of the same volume, wherein the amount of increased heat storage capacity increases with increasing proportion of the tank volume occupied by the phase change material container (assuming the PCM is stearic acid, as described in the example above). A graph provided at FIG. 21 illustrates this effect, showing the percent increase in energy storage capacity (compared to a water-only tank of the same volume), as a function of the percent of the tank water storage volume replaced by the phase change material container. Two lines are illustrated, differing in the thermal storage effect achieved over different temperature changes. Line 214 demonstrates the enhanced energy storage for a water temperature change of 70° F. to 120° F. Line 216 demonstrates the energy storage enhancement as the water heats from 100° F. to 120° F. That is, as a function of the percentage of water in the heater displaced by the PCM, line 214 illustrates the percentage increase in heat transferred by a given flow of refrigerant through a refrigerant conduit to the water heater (whether directly to the PCM or indirectly to the water via the PCM) in a PCM based embodiment as illustrated in FIGS. 14-20, as compared to a the amount of heat transferred directly to the water of the same tank without the PCM interior container and with the refrigerant conduit wrapped around the exterior of the water-only tank, while raising the water temperature from 70° F. to 120° F., while line 216 provides the same information for raising the water temperature from 100° F. to 120° F. As apparent from FIG. 21, a greater increase is apparent in the rise from 100° F. to 120° F., because the water-only tank has greater capacity to store energy when rising from the lower starting point of 70° F.

Because displacement of water by the phase change material reduces the amount of water available for use at the facility in which the water heater is located, these offsetting criteria of increased heat storage capacity and decreased water storage capacity can be balanced in a given situation as desired. In one embodiment, for example, the phase change material container displaces approximately 25% of water in the interior tank volume.

Returning to FIG. 1, control system 20 may comprise a programmable logic controller (PLC) that is programmed to define instructions executable by the PLC and that operates as the general system controller. Housed, for example, with outdoor unit 14, the PLC communicates with and controls (via suitable electrical connections, relays, power sources, and other electromechanical connections, as should be understood in this art) the actuation and operation of the components described herein, including but not limited to the compressor, outdoor coil fan, indoor coil fan, and all electrically controlled valves. As such, the control system communicates with and controls the air conditioning system, including the valve system within the refrigerant flow path that, in conjunction with the compressor (also controlled by the control system) controls refrigerant flow. The reference to connections between control system 20 and each of outdoor unit 14, indoor unit 16, and water heater 18 (and between control system 70 and each of outdoor unit 64, indoor unit 66, and water heater 68, and between control system 120 and each of outdoor unit 114, indoor unit 116, and water heater 138) encompass such communications and control. Such communication may also encompass communication between the control system and a temperature sensor at the outdoor unit, which provides a signal to the control system corresponding to temperatures of the outdoor unit's ambient environment. Furthermore, control system 20 receives input signals from one or more thermostats in the building's conditioned space that provide instructions regarding whether to activate the air conditioning system, deactivate the air conditioning system, actuate the air handler fan, operate the system in air cooling mode, and (where the air conditioning system is a heat pump) operate the system in air heating mode. The thermostat, being located in the conditioned space and including a temperature sensor, may also output to the control system a signal corresponding to temperature of the conditioned space. The operation of thermostats in generating such instructions should be well understood and is, therefore, not discussed further herein. The thermostat may be considered a part of control system 20, and, in any event, functions typically performed by the thermostat can be shared or performed by control system 20. The reference to communication between controller 20 and indoor unit 16 (and between control system 70 of FIG. 4 and indoor unit 66, and between control system 120 and indoor unit 116) encompass such communications between the control system and the thermostat(s), as well as communication between the control system and the air handler and between the control system and the water heater. The control system activates and deactivates the air handler, based on the air conditioning system programming in response to signals from the thermostat and possibly signals from sensors indicating system operating parameters, as should be understood. In an inactive state, the air handler does not force air into, draw air into, or otherwise move air through the conditioned space. As discussed herein, actuation of the air conditioning system may refer to activation of the compressor to move refrigerant through the refrigerant path, activation of the condenser fan, and activation of the air handler (fan), in certain embodiments. But as discussed herein, in some circumstances the air conditioning system may be actuated without activating the air handler. In that sense, the control system activates the air conditioning system while maintaining the air handler in an inactive state.

Reference to communication between controller 20/50/120 and indoor unit 16/66/116 also encompasses communication between the control system and the water heater, e.g. the water heater controller or, particularly where the water heater controller's functions are incorporated by the control system, between the control system and the water heater temperature sensor(s) and heat source(s). As should be understood, water heater 18 may include an electronic controller (not shown) that can receive manual or electronic instructions to activate and deactivate a water heater and can respond to such instructions as well as activating and deactivating the water heater in response to pre-programmed set point temperatures. The water heater's high and low set point temperatures are typically capable of manual or electronic setting by the operator and/or at installation. Once set, the water heater's controller monitors the output of one or more temperature sensors in thermal communication with water inside the water heater and compares the water temperature with the predetermined set points. If the water heater is in an inactive state, and if the water tank temperature is above the water heater's low set point, the water heater controller takes no action until the water tank temperature reaches or falls below the low set point. At this point, the water heater controller activates the water heater's internal heat source, which begins to heat the water. The water heater controller continues to receive and monitor water temperature signals from the one or more water heater temperature sensors, and maintains the water heater heat source active until the controller receives a signal from the one or more temperature sensors indicating that the water heater temperature has exceeded the high set point. The water heater goes back to an inactive mode and does not reactivate until manually activated or until the signal from the one or more temperature sensors indicates that the water temperature has again fallen to or below the low set point.

In the presently described embodiments, however, the water heater controller passes the water heater temperature sensor signals or corresponding data to control system 20/70/120, which then determines whether to heat the water heater with refrigerant heat or with the water heater's inherent heat source, as described above. If, or when, the control system decides to operate the water heater heat source, the control system sends a corresponding signal to the water heater controller, which actuates the heat source. The water heater controller may thereafter monitor water temperature and deactivate the heat source when the temperature reaches the high set point, or it may continue to pass the temperature signal or data to the control system, which makes the decision when to deactivate the water heater heat source and sends an appropriate instruction signal to the water heater controller. Still further, the water heater controller may be omitted, and the control system 20/70/120 put in direct communication with the water heater temperature sensor(s) and heat source control (i.e. activation and deactivation control) in order to perform the functions described herein. The reference to communication between controller 20 and water heater 18 (and between control system 70 and water heater 68, and between control system 120 and water heater 138) encompass such communications between the control system and the water heater controller or, particularly where the water heater controller's functions are incorporated by the control system, between the control system and the water heater temperature sensor(s) and heat source(s).

Similarly, as described below, control systems 20 and 70 communicate with variable fan controllers 25 and 115, and the communications indicated between control systems 20 and 70 and outdoor and indoor units 14/64 and 16/66 reflect such communications. Still further, however, the functions of the variable fan controllers may also be incorporated entirely within the control system, so that the fan controllers may be omitted and the control system communicates directly with temperature sensors 27/117, or 42 or 46.

It will be understood from the present disclosure that the functions ascribed to control system 20/70/120 may be embodied by computer-executable instructions of a program that is embodied on a computer-readable medium and that executes on one or more computers, for example embodied by a residential or commercial split system air conditioning system controller or, as discussed above, a PLC. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or flash memory), a compact disc read-only memory (CD-ROM), a non-volatile memory supporting a PLC, or other optical or magnetic storage device. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, as well as personal computers, hand-held computing devices, microprocessor-based or programmable consumer or industrial electronics, and the like. Aspects of these functions may also be practiced in distributed computing environments, for example in so-called "smart home" arrangements and systems, where tasks are performed by remote processing devices that are linked through a local or wide area communications network to the components otherwise illustrated in the Figures. In a distributed computing environment, programming modules may be located in both local and remote memory storage devices. Thus, control system 20 may comprise a computing device that communicates with the system components described herein via hard wire or wireless local or remote networks.

A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi processor architectures can be employed as the processing unit.

Software applications may act as an intermediary between users and/or other computers and the basic computer resources of electronic control system 20, as described, in suitable operating environments. Such software applications include one or both of system and application software. System software can include an operating system that acts to control and allocate resources of control system 20. Application software takes advantage of the management of resources by system software through the program models and data stored on system memory.

The controller may also, but does not necessarily, include one or more interface components that are communicatively coupled through the bus and facilitate interaction with the control system. By way of example, the interface component can be a port (e.g., serial, parallel, PCMCIA, USC, or FireWire) or an interface card, or the like. The interface component can receive input and provide output (wired or wirelessly). For instance input can be received from devices including but not limited to a pointing device such as a mouse, track ball, stylus, touch pad, key pad, touch screen display, keyboard, microphone, joy stick, gamepad, satellite dish, scanner, camera, or other component. Output can also be supplied by control system 20 to output devices via the interface component. Output devices can include displays (for example cathode ray tubes, liquid crystal display, light emitting diodes, or plasma) whether touch screen or otherwise, speakers, printers, and other components. In particular, by such means, control system 20 received inputs from, and directs outputs to, the various components with which control system 20 communicates, as described herein.

In general, the control system receives signals from the thermostat, the water heater, and possibly temperature sensors or other operating parameter sensors that are not part of the thermostat or water heater. The controller activates or deactivates the air conditioning system to provide or stop the provision of conditioned air to a conditioned space in response to the thermostat signals. It decides whether to activate a water heating source in response to the water heating signal, and it decides which water heating heat source to utilize in response to the water heater signals and the operating parameter signals (which may include the thermostat signal) and in some instances in response to the air conditioning mode in which the air conditioning system exists. The apparatus for carrying out these functions, and the manner of their operation, are described below.

Referring initially to FIG. 1, outdoor condensing unit 14 includes a condenser coil 22, an associated condenser fan 24, and a compressor 26. The condenser coil and compressor are coupled, as shown, by a refrigerant tubing circuit 28 and liquid refrigerant line portions 30 and 32, to indoor unit evaporator coil 34 and to a heat conductive refrigeration tube within a metal tank portion 36 of water heater 18 and serving as a refrigerant to tank water heater exchanger 38 for water heater 18. Although a single coil is illustrated, multiple parallel coils may be utilized to reduce pressure drop through the heat exchanger, as discussed below. Thus, it should be understood that reference to a heat exchanger "coil" or "coil system" encompasses one or multiple coils, in series or in parallel.

Operatively linked to electronic control system 20 are (1) an electronically controlled regulator valve 40 with an associated refrigerant temperature sensor 42 installed as shown in refrigerant tubing circuit 28 within condensing unit 14, (2) an electronically controlled regulator valve 44 and an associated refrigerant temperature sensor 46 installed as shown in refrigerant tubing circuit 28 between line 32 and (adjacent to) a refrigerant inlet 48 of heat exchanger coil 38, and (3) a normally open solenoid valve 50 installed in a refrigerant bypass line 32a between heat exchanger inlet 48 and a heat exchanger refrigerant outlet 52. In another embodiment, valves 44 and 50 are replaced by a single valve sitting at the split between the part of the refrigerant path that flows through heat exchanger 38 and the part of the refrigerant path that bypasses the heat exchanger, where the single valve selectively directs refrigerant flow alternatively through the heat exchanger or the bypass portion. As illustrated in FIG. 1, water to be heated flows into water heater tank 36 via a water inlet pipe 54 and, in response to a heated water demand, is discharged from tank 36 via a hot water supply pipe 56.

FIGS. 1-7 illustrate temperature sensors 42, 46, 27, 102, and 117. As described below, temperature sensors 27 and 117 are utilized by fan controllers 25 and 115, respectively, in variably driving the outdoor and indoor coil fans. Each of temperature sensors 42, 46, and 102 illustrate other positions at which temperature sensors may be placed to provide temperature information to drive control of the outdoor fan, in place of temperature sensor 27. These sensors should, therefore, be understood as alternatives to sensor 27 and may be omitted in the presence of sensor 27. Temperature sensor(s) (not shown) may also be disposed in or upon the water tank to measure temperature of water and/or PCM within the tank and/or the PCM tank and output such information to the controller.

Further, the Figures illustrate various electronically controlled valves as normally open or normally closed valves, whereas other valves are illustrated as electronically controlled proportional valves. As will be understood, the normally open or normally closed valves transition between open or closed states, whereas the proportional valves can be used to meter fluid flow if desired. In the examples discussed herein, all the electronically controlled valves transition between fully open and fully closed states, and it is thus encompassed within the present disclosure that all valves may be non-proportional valves. It should also be understood, however, that the use of proportional valves to meter fluid flow, for example via the condenser bypass valves, is encompassed within the scope of the present disclosure.

An expansion valve 58 is disposed in line 32 at an inlet to indoor coil 34. As should be understood, an expansion valve receives a fluid input at a high pressure and, depending on the settings within the valve, outputs the fluid at a lower pressure. This allows pressurized refrigerant entering coil 34 (when used as an evaporator) to drop in pressure in the evaporator coil and change phase from a liquid to a gas.

Under the conditions illustrated in FIG. 1, control system 20 receives a signal from a controller or a temperature sensor in water heater 18 indicating that the tank's water temperature is above the water heater's low set point, which is stored in the control system's memory. That is, no water heating is called for. Assume, also, that control system 20 has received a signal from the building's thermostat (not shown) requiring the air conditioning system to provide cool air to the conditioned space. With air conditioning system 12 accordingly in an air cooling-only mode, without need for the control system to also select and actuate a water heating heat source (e.g. the water heater's heat source or refrigerant heat transferred to the water in tank 36 via heat exchanger 38), gaseous refrigerant flows from evaporator coil 34 to compressor 26 via suction line 30. Compressor 26 pumps the gaseous refrigerant forward, increasing the refrigerant's pressure and temperature and causing the now-hotter refrigerant gas to flow through condenser coil 22. Control system 20 actuates fan 24 (at a constant speed) via a variable fan speed control 25 to thereby push or draw air over the condenser coils, causing the gaseous refrigerant to cool in coil 22 and thereby change phase from a gas to a liquid. This draws heat energy from the refrigerant into the moving air, thereby dissipating heat from the refrigerant (and, therefore, from the conditioned space) into the ambient environment. Still under the pressure provided by compressor 26, the now-liquid refrigerant flows from the output of condenser 22 to the split between the input line to heat exchanger 38 and the bypass line including valve 50. Control system 20 maintains valve 40, between the condenser and the compressor, closed. Since no water heating is called for, control system 20 maintains valve 44 closed and valve 50 in its normally fully open position. This blocks refrigerant flow to the heat exchanger coil, and liquid refrigerant exiting condenser coil 22 therefore flows through open solenoid valve 50, bypassing water heater heat exchanger 38, to expansion valve 58. Expansion valve 58 drops the pressure of the liquid refrigerant as it enters evaporator coil 34. Within the evaporator, the refrigerant transitions to gaseous phase, drawing heat energy from air flowing over coil 34, which is disposed in the air flow path generated by an air handler fan (the air flow path is illustrated schematically in FIG. 1 by the relationship of coil 34 and the illustrated fan). This cools the indoor air being re-circulated by the air handler, thereby cooling the conditioned indoor space. The now-warmer gaseous refrigerant discharged from evaporator coil 34 then returns to compressor 26 via suction line 30, and the cycle repeats.

As noted, control system 20 controls the operation of heat exchanger 38 in response to receipt of temperature information from a water heater controller or from a temperature sensor at tank 36. As should be understood, water heater 18 typically operates between low and high temperature set points. In first presently-described embodiments, control system 20, rather than the water heater's independent controller, responds to water heater water temperature when it falls below the water heater's low set point, selecting between the water heater's inherent heat source and heat exchanger 38 as the means by which to add heat to the water heater, depending upon which heat source results in higher overall system efficiency. The basis for this decision is discussed in more detail below.

In second example embodiments, wherein water heater water temperature falls below the water heater's low set point, control system (e.g. controller) 20 actuates the water heater's inherent heat source and checks the status of the air conditioning system of system 10. If the air conditioning system is active, the control system also closes valve 50 and opens valve 44 so that refrigerant is directed to the water heater's interior PCM tank to thereby contribute heat to the PCM. If the air conditioning system is not active, the controller relies only on the water heater's inherent heat source. The control system (e.g. controller) continues to actuate the inherent heat source until the water tank water reaches its high set point, when the controller deactivates the inherent heat source. If the air conditioning system activates during the period between the low and high set points in some embodiments, the control system opens valve 44 and closes valve 50 so that refrigerant contributes heat to the PCM while both (a) the air conditioning system remains above and (b) the water tank water temperature is below its high set point, but if either condition ceases to be true, the control system closes valve 44 and opens valve 50.

Turning now to FIG. 2, when water heater 18 requires refrigerant heat (as determined by comparison of the value of a temperature signal from the non-illustrated temperature sensor in a bottom portion of tank 36 to the stored water tank low set point), control system 20 (FIG. 1) appropriately positions the various previously described valves 40, 44, and 50 to which it is linked to cause the refrigerant traversing tubing circuit 28 from the outdoor unit to pass through heat exchanger 38, thereby adding refrigerant heat to water in tank 36, before flowing to evaporator coil 34. When control system 20 detects that heating responsibility should shift from the heat exchanger to the water heater heat source, or that water heater 18 no longer needs refrigerant heat, either because the water tank water temperature has reached the high set point or because conditions in other embodiments trigger refrigerant deactivation as described below, it returns air conditioning system 12 to its air cooling-only mode, as discussed with regard to FIG. 1, in which all of the refrigerant flow traversing tubing circuit 28 bypasses water heater coiled tube heat exchanger 38.

With regard either to embodiments in which activation of refrigerant heat to the PCM is based only on air conditioning system activation and hot water need or in which refrigerant heat activation is additionally based upon system efficiency, when the control system receives a signal from the temperature sensor indicating water heating is needed, and when air conditioning system 12 is otherwise in an operative mode to provide conditioned air to a conditioned space, control system 20 switches fan speed controller 25 from full speed (at which fan 24 is operated during air cooling-only mode) to a variable speed mode (in which fan speed controller 25 controls the speed of fan 24 in response to a temperature sensor 27, as described below), opens valve 44, closes valve 50, and opens valve 40. By opening valve 44 and closing valve 50, the control system directs the entirety of the refrigerant flow through heat exchanger 38. The condenser coil, however, receives only part of the refrigerant flow output from compressor 26. By opening valve 40 and allowing some of the refrigerant flow to bypass the condenser, the refrigerant flowing from condenser 22 and valve 40 to heat exchanger 28 contains both cooler liquid and warmer gaseous refrigerant. That is, the refrigerant flow includes hot gaseous refrigerant that, but for bypass valve 40, would have cooled and condensed in coil 22 but is instead diverted to coil 38, which in turn cools the refrigerant, condenses the gaseous refrigerant component of the dual phase refrigerant flow that reaches the heat exchanger, and transfers the removed heat to water within water heater tank 36. Accordingly, heat exchanger 38 may be considered a sub-condenser or sub-cooler of the overall condenser, as it completes the condensing function begun by condenser coil 22.

Valve 40, therefore, effectively diverts heat from the compressor output to the heat exchanger that the condenser would otherwise have removed. The amount of heat that the valve diverts is defined by the balance of refrigerant flow between valve 40 and coil 22. This balance is, in turn, defined by the speed of fan 24. The bypass refrigerant flowing through valve 40 is warmer than the condensed refrigerant flowing through condenser coil 22. As should be understood, the cooler, condensed refrigerant presents less resistance to flow through the condenser coil than does the hot gaseous refrigerant through bypass valve 40, even though the bypass valve path is much shorter in length. Thus, if valve 40 is opened to its fully open state when condenser 22 is operating at its full capacity, most of the refrigerant from compressor 26 will flow through the condenser rather than the bypass valve, thereby delivering a relatively low amount of additional, diverted heat to the heat exchanger. To increase the refrigerant flow balance toward bypass valve 40, variable fan controller 25 reduces the speed of fan 24 when water heating is needed. This reduces the rate at which air flows over the condenser coils, thereby reducing the rate at which refrigerant in the condenser coil cools and correspondingly increasing the resistance to refrigerant flow. This, in turn, increases refrigerant flow through the bypass valve and increases the heat contributed to the heat exchanger.

At system set up, control system 50 downloads a target temperature to fan controller 25. When, in system operation, controller 25 receives a signal from controller 20 indicating that water heating mode has begun, fan controller 25 ceases full speed fan operation and compares the output of temperature sensor 27 to the target temperature. If the sensor 27 temperature is above the target temperature, controller 25 increases the speed of fan 24, which thereby draws air over (and cools) the refrigerant in the coil at a higher rate, and reduces the amount of hot bypass refrigerant flowing through valve 40. If the sensor 27 temperature is below the target temperature, controller 25 decreases the speed of fan 24, thereby reducing the heat removed from the refrigerant, and increasing its flow resistance, to thereby allow more hot gaseous refrigerant to bypass the condenser coil. Thus, the target temperature represents the temperature at which the condenser/bypass combination provides refrigerant to the heat exchanger. The target temperature preferably does not exceed the temperature at which compressor 26 outputs gaseous refrigerant or drop below the temperature of water in tank 36. In another embodiment, target temperatures are not used, bypass valve 40 is omitted, and fan 25 operates at a constant speed.

Selection of the target temperature may depend on the configuration of system 12. Heat exchanger 38 cools refrigerant flowing through its coil (toward a lowest temperature equal to the temperature of water in the water heater tank) but removes heat from the refrigerant at a rate slower than the condenser's heat removal rate. If the target temperature for refrigerant exiting outdoor unit 14 is too high, the residual heat retained within the refrigerant flow path (due to the heat exchanger's failure to remove the heat) increases flow path pressure and, therefore, the work done by compressor 26, for no offsetting heat transfer gain at the water heater or the conditioned air, thereby reducing system efficiency. On the other hand, setting the target temperature too low reduces the heat exchanger's ability to transfer heat to the water heater tank. One way of selecting a target temperature within these boundaries is to operate the system in a pre-installation calibration process, testing the system's efficiency and heat transfer for various target temperatures within the possible temperature range and selecting the target temperature that balances these considerations to the user's preference. In one embodiment, the target temperature is set to the highest temperature from which heat exchanger 38 can successfully bring refrigerant into temperature equilibrium with the PCM at any point in the tank's water/PCM temperature range between the water heater's low and high set points. Since the heat exchanger's heat transfer capacity is lower at other tank water temperatures, selection of this target results in some residual heat remaining in the refrigerant flow path as the tank's water temperature moves from this maximum point, but this cost may be acceptable in order to allow the heat exchanger its maximum heat transfer capacity. In a further embodiment, control system 20 downloads a range of temperature targets corresponding to changing water heater temperatures determined at calibration, and controller 25 continuously updates the target temperature in response to temperature data from the control system as water heater water temperature changes. In a still further embodiment, the control system initially downloads a target temperature equal to a predetermined temperature increment above the present tank water temperature. As tank water temperature rises, the control system increases the target temperature, up to the maximum target temperature. The predetermined increment is selected at system configuration and can be set as desired.

When the control system receives a signal from the water heater temperature sensor (either directly or through the water heater controller) indicating a need for water heating, control system 20 first determines the air conditioning mode (i.e. providing conditioned air to the conditioned space, or not providing conditioned air to the conditioned space, and if providing conditioned air in embodiments where the system both heats and cools, whether in air-heating or air-cooling configuration) in which the air conditioning system presently exists. As described below, control system 20 may, in some embodiments, have calibrated data sets for some or all of its air conditioning operation modes that represent a comparison of system efficiency when relying on the refrigerant heat exchanger or, alternatively, on the water heater's inherent heat source. If the control system has no data sets for its present air conditioning mode, it activates the water heater heat source and relies on that heat source to fully heat the water, without utilization of the heat exchanger, or in other embodiments activates the inherent heat source simultaneously. If it does have data sets for the present air conditioning mode, the control system identifies (1) ambient air temperature as detected from a temperature sensor at outdoor unit 14 that communicates with the control system, (2) indoor air temperature as detected by the indoor thermostat, and (3) water tank temperature as detected by the tank temperature sensor. The control system applies this input data to the air-conditioning-mode-dependent data sets which, given the specific operating parameter values represented by the input data, provide a ratio value representing a comparison of system efficiency (at these parameter values) when relying on the refrigerant heat exchanger and, alternatively, when relying on the water heater's inherent heat source. Based on this comparison, control system 20 selects between the two heating options, sets the system valves accordingly, and provides corresponding control signals to the water heater. Water heating continues, utilizing the selected heat source, but the control system repeatedly monitors these three input variables and correspondingly re-assesses the efficiency comparison based on the data sets. If the choice of heat source resulting from these changing variables changes from the then-currently active heat source to the other, and if that condition persists uninterrupted for some predetermined period of time, e.g. one minute, then the control system deactivates the presently active heat source and activates the other heat source. The control system continues to monitor the variables, and continues to monitor for a change in chosen heat source that persists for the predetermined time period, and changes the heat source if that condition occurs. In this manner, the choice of heat source can change multiple times, as conditions change, before the water heater reaches its high set point. When the control system detects that the water heater has reached the high set point, the control system deactivates the then-active heat source and does not reactivate either heat source until receiving a water temperature signal indicating the tank's water temperature has dropped below the water heater's low set point, at which point the cycle repeats. In a further embodiment, the control system always assumes that use of the refrigerant heat exchanger is more efficient at low water heater temperatures, and so always initially utilizes the heat exchanger.

The data set represents a comparison of system efficiency between two conditions: (1) air conditioning system and water heater operation when the refrigerant heat exchanger is active and the water heater heat source is inactive, and (2) air conditioning system and water heater operation when the refrigerant heat exchanger is inactive and the water heater heat source is active. For each condition, overall system efficiency may be defined as the system's coefficient of performance, or COP. The COP may be described as the ratio of heating or cooling energy (BTU/hr or Watts) provided to the conditioned air plus heating energy (BTU/hr or Watts) moved into the water heater water, divided by energy (BTU/hr or Watts) consumed by the air conditioning system and water heater in providing such energy to the conditioned air and the water heater water.

As should be understood in this art, the energy input to the water and conditioned air, and energy consumed, may depend on the electrical and mechanical configuration of the air conditioning and water heating system. For a given system, however, this consideration is a constant and can be accommodated in the calibration process as described herein. Relevant parameters that can vary, however, are:

Selected water heat source, i.e. the refrigerant heat exchanger or the water heater's inherent heat source;
Air conditioning mode, i.e. (1) air cooling, (2) air heating, or (3) inactive (neither air cooling nor air heating);
Outdoor ambient temperature;
Water tank water (and PCM) temperature; and
Indoor temperature.

To calibrate the system, the air conditioning and water heating system (e.g. as illustrated in FIGS. 1-3, FIGS. 4-7, or FIGS. 8-13) is constructed and installed in conditions under which the defining variables can be controlled. The outdoor unit is operatively installed at a location at which it is possible to both operate the outdoor unit and vary the ambient temperature. The indoor unit is installed at a location separate from the outdoor unit at which it is possible to vary the indoor (conditioned space) ambient temperature. The water heater is disposed at a location at which the water heater water temperature can be controlled independently of the outdoor unit and indoor unit ambient temperatures.

Each system is then calibrated for each possible combination of the first two variables. Consider, first, the system described with respect to FIGS. 1-3. As is apparent from the discussion herein, the system does not have an air heating mode, and in its inactive mode the system valves are not configurable to permit use of the refrigerant heat exchanger. Thus, this system can operate selectively between the refrigerant heat exchanger and the water heater heat source only in its air cooling mode. Accordingly, a data set will exist only for the air-cooling mode, and the system would need efficiency calibration only under the following two conditions:

Air cooling space conditioning and operation of refrigerant heat exchanger; and
Air cooling space conditioning and operation of water heater heat source.

Each of the systems described with respect to FIGS. 4-7 and FIGS. 8-13 can operate selectively between the refrigerant heat exchanger and the water heater heat source in any of its three air conditioning modes, and thus can be calibrated under the following six conditions:

Air cooling space conditioning and operation of refrigerant heat exchanger;
Air cooling space conditioning and operation of water heater heat source;
Air heating space conditioning and operation of refrigerant heat exchanger;
Air heating space conditioning and operation of water heater heat source;

Inactive air conditioning and operation of refrigerant heat exchanger; and

Inactive air conditioning and operation of water heater heat source.

Assume, then, that a given system is assembled in such a calibration environment, and operated sequentially in each of its possible conditions as noted above. In each condition, two of the five COP-relevant variables are fixed, and the remaining three variables (outdoor ambient temperature, water tank water/PCM temperature, and indoor (conditioned space) temperature) can be controlled in the calibration environment. In particular, each variable can be varied over a respective range of values that would be reasonably expected to occur in the system's use. Given the three variables, and given the respective expected ranges for each, the system is operated in the calibration environment while varying the three variables and measuring or estimating the components of the system's COP. That is, for combinations of the three variables over their assumed operative ranges, the system determines and records system COP. For a given system, the resulting data set is stored or otherwise accessible to control system 20/70/120. Accordingly, after completing the calibration process for each of the dual variable (selected water heater heat source/air conditioning mode) configurations for a given system, the control system has, for each configuration, a COP data set from which COP can be defined with knowledge of the values for the three defining variables (outdoor ambient air, water tank water temperature, and indoor temperature).

In a given system's operation, the control system always knows the system's air conditioning mode, and it receives values for the three defining variables from corresponding sensors. As noted, a temperature sensor at the outdoor unit provides outdoor ambient temperature. The system thermostat provides indoor temperature, and the water heater temperature sensor provides water/PCM temperature. Assume, then, that the system is operating in one of the three air conditioning modes, and the control system receives a signal from the water heater temperature system indicating a need for water heating. With calibration complete, the control system has a data set for each of the possible operating conditions, corresponding to selected water heater heat source and air conditioning mode. If the system is operating in one of the air conditioning modes for which a COP data set exists (e.g. any of the three air conditioning modes for the systems of FIGS. 4-7 and 8-13, but only air cooling mode for the system of FIGS. 1 and 2), the control system retrieves the two data sets (one for refrigerant heat exchanger, and one for water heater water source) corresponding to that air conditioning mode, detects the actual defining variable values from the corresponding sensor inputs, and determines the COP value defined by the three variables for each of the two data sets. If the ratio of the COP for the system utilizing the refrigerant heat exchanger to the COP for the system utilizing the water heater heat source is equal to or greater than 1.0, the control system activates the refrigerant heat exchanger (i.e. with regard to the embodiment of FIG. 1, opens valve 44, closes valve 50, opens valve 40, and instructs controller 25 to control fan 24 speed to maintain the target refrigerant level) and deactivates the water heater heat source, else if the ratio is less than 1.0, the control system deactivates the refrigerant heat exchanger and activates the water heater heat source. The control system continuously monitors the three defining variables. As long as the water heater water temperature is below the water heater's high set point, the control system repeatedly (e.g. every ten seconds) measures the three variables and recalculates the ratio. If the ratio changes state (i.e. moves across the 1.0 set point, thereby indicating a change in water heater heat source from the presently activated source) and persists in the changed state for more than a predetermined period of time, e.g. one minute, the control system deactivates the presently active water heater heat source and activates the other water heater heat source. The control system thereafter continues to repeatedly read the defining variable values, re-determine the ratio, and change the water heat source if so indicated by a persistent ratio. This process continues until the water heater temperature reaches the high set point, at which point the control system deactivates both water heater heat sources, and takes no further water heating action until the water temperature signal indicates that the water heater water temperature has again fallen to or below the water heater's low set point, at which point the cycle repeats.

In a further embodiment, the control system selects the water heater heat source based on the system COP comparison as described above, but with the additional qualification that even if the COP comparison continues to favor selection of refrigerant heat exchanger, if that selection persists continuously for at least a predetermined period of time, e.g. thirty minutes, the control system will activate the water heater heat source and deactivate the refrigerant heat exchanger and thereafter allow the water heater heat source to heat the water heater water up to the water heater's high set point, without consideration of comparative system efficiency. Since the refrigerant heat exchanger is typically unable to bring the water heater to its final high set point alone, this modification to the process protects against system dedication to the refrigerant heat exchanger under conditions in which the heat exchanger cannot bring the water to the final set point.

It should be understood that variations in the heat source selection process are encompassed by the present disclosure. For example, it should be understood in view of the present disclosure that use of the refrigerant heat exchanger tends to be more efficient than use of the water heater heat source when the water heater water temperature is low. At the lower temperatures, the water heater draws more heat from the refrigerant flowing through the heat exchanger than at higher temperatures, thereby lessening the resistance that the heat exchanger coil provides to refrigerant flow and reducing system pressure. As the water heater water temperature is always at the water heater low set point when the control system initiates water heating, in one embodiment the control system defaults to operation of the refrigerant heat exchanger at cycle initiation, without reference to the COP comparison (assuming data sets exist for the existing air-conditioning mode). Thereafter, the control system continuously monitors the COP comparison, as described above, and switches to the water heater heat source when the ratio drops below 1.0 and persists below that level for at least the predetermined period of time. Also, recognizing the likelihood that, once the COP comparison transitions the heat source to the water heater heat source, subsequent COP comparison would likely continue to select the water heater heat source, then once the control system switches to the water heater heat source, the control system no longer examines COP, instead maintaining activation of the water heater heat source through the end of water heating. In this embodiment, the control system may continue to monitor water heater temperature following the switch to the water heater heat source or, alternatively, relinquish control of the water heater heating cycle to the water heater controller to complete the cycle, as discussed above.

It will be understood in view of the present disclosure that various methodologies may be used to determine the components of the COP calculations during system calibration. To determine energy actually moved into the water heater water system, control system 20 may store water and PCM temperature values received from the water heater's temperature sensor(s) (at least one being adjacent the PCM tank) over a predetermined period of time, thereby determining actual change in water and PCM temperature. Since the control system also knows the volume of water and PCM in the water heater, the control system can determine the corresponding BTU/hr and convert that number to Watts.

As should be understood in this art, precise determination of actual energy moved into or out of the conditioned air involves a determination of enthalpy change over the predetermined time period. While methods of making such measurements are known, they may also be unavailable or impractical. However, since the control system can determine whether the air handler fan has been active over the predetermined period of time, and since the control system knows the air handler's capacity, the control system can estimate the volume of air that the air handler has moved into the conditioned space. The control system also measures the conditioned space temperature from the thermostat signals, and based on the temperature change in the conditioned space and the estimated volume of air moved into the conditioned space within the predetermined period of time, the control system can estimate BTU/hr over that period, within an approximately 10% accuracy. Again, the control system can convert this number to Watts.

In some instances, of course, certain components of the COP calculation do not exist. For example, where the air conditioning mode is inactive, there is no energy moved into or out of the conditioned space.

The denominator of the COP calculation is the energy consumed by the system in contributing the energy represented by the numerator. This, in turn, is the energy used by the compressor, the coil fans, and the water heater over the predetermined time. Compressor power utilization may be directly measured in calibration by a watt meter or by continuously measuring compressor suction pressure, discharge pressure and suction gas temperature, in view of the compressor's performance curves. Fan power can be measured by a watt meter but can be estimated or assumed based on lab testing.

Figure 3:
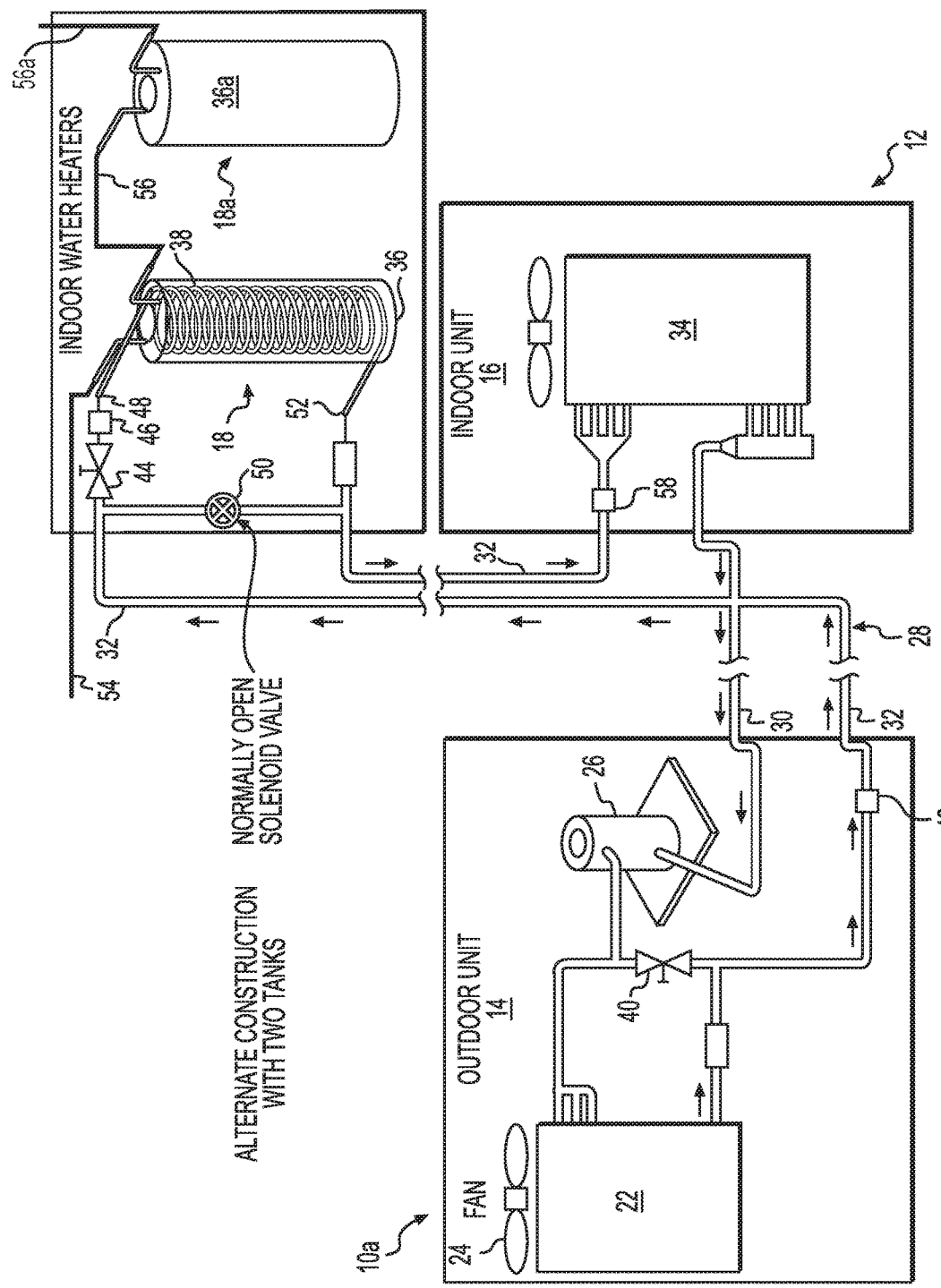
FIG. 3 is a schematic diagram of the system as in FIG. 2, but with the air conditioning system providing refrigerant heat to one of two water heater tanks in a two water heater tank arrangement.

The overall air conditioner/water heater circuit 10a schematically illustrated in FIG. 3 is identical to the system 10 described above with respect to FIGS. 1 and 2, with the exceptions that (1) an additional water heater 18a, having either electric or gas heating apparatus associated therewith, but without an associated coiled tube refrigerant-to-PCM-to-water heat exchanger, is connected in series with the previously-described water heater 18 such that water exiting water heater 18 via pipe 56 flows through the additional water heater 18a and is then discharged therefrom through a hot water outlet pipe 56a, and (2) water heater 18 is not provided with electric or gas heat, but receives only refrigerant heat via its tubing heat exchanger portion 38, thus functioning solely as a water pre-heating device. Water heater 18a may correspond in capacity to water heater 18 as shown in FIGS. 1 and 2, which is for example a forty to fifty gallon electric or gas water heater. The water heater 18 of FIG. 3 may be of a larger, smaller, or similar capacity.

The configuration shown in FIG. 3 emphasizes the advantages of the refrigerant flow heat exchanger when water tank water temperature is low. The two tank configuration allows hot water to be stored when the air conditioning system 12 is running (in cooling or heating modes) during times when there is little or no demand for hot water, thereby providing additional low cost hot water capacity during periods of time when the demand for hot water is high. It also improves the efficiency of the air conditioning system compared to the single tank arrangement described above with respect to FIGS. 1 and 2, since water in pre-heating tank 18 (FIG. 3) will usually be at a lower temperature than water in the main tank during periods of time when there is little demand for hot water.

The system does not use a comparison of efficiencies to control when to actuate and de-actuate the water heating heat exchanger 38 shown in FIG. 3. Since the refrigerant heat exchanger is not proximate the same water heater that is heated by the water heater heat source, the efficiency comparison described above with respect to FIGS. 1 and 2 (and below with respect to FIGS. 4-7 and 8-13), is not applicable. Rather, water heater 18a heats under its independent heat source, and the air conditioning system activates the refrigerant heat exchanger up to a predetermined set point temperature of the pre-heated tank 18. The set point is set to a level below the temperature of the compressor output temperature, but it is otherwise selectable by the operator. A pre-heating tank may also be used with the air conditioning systems described below with respect to FIGS. 4-7 and 8-13.

Figure 4:
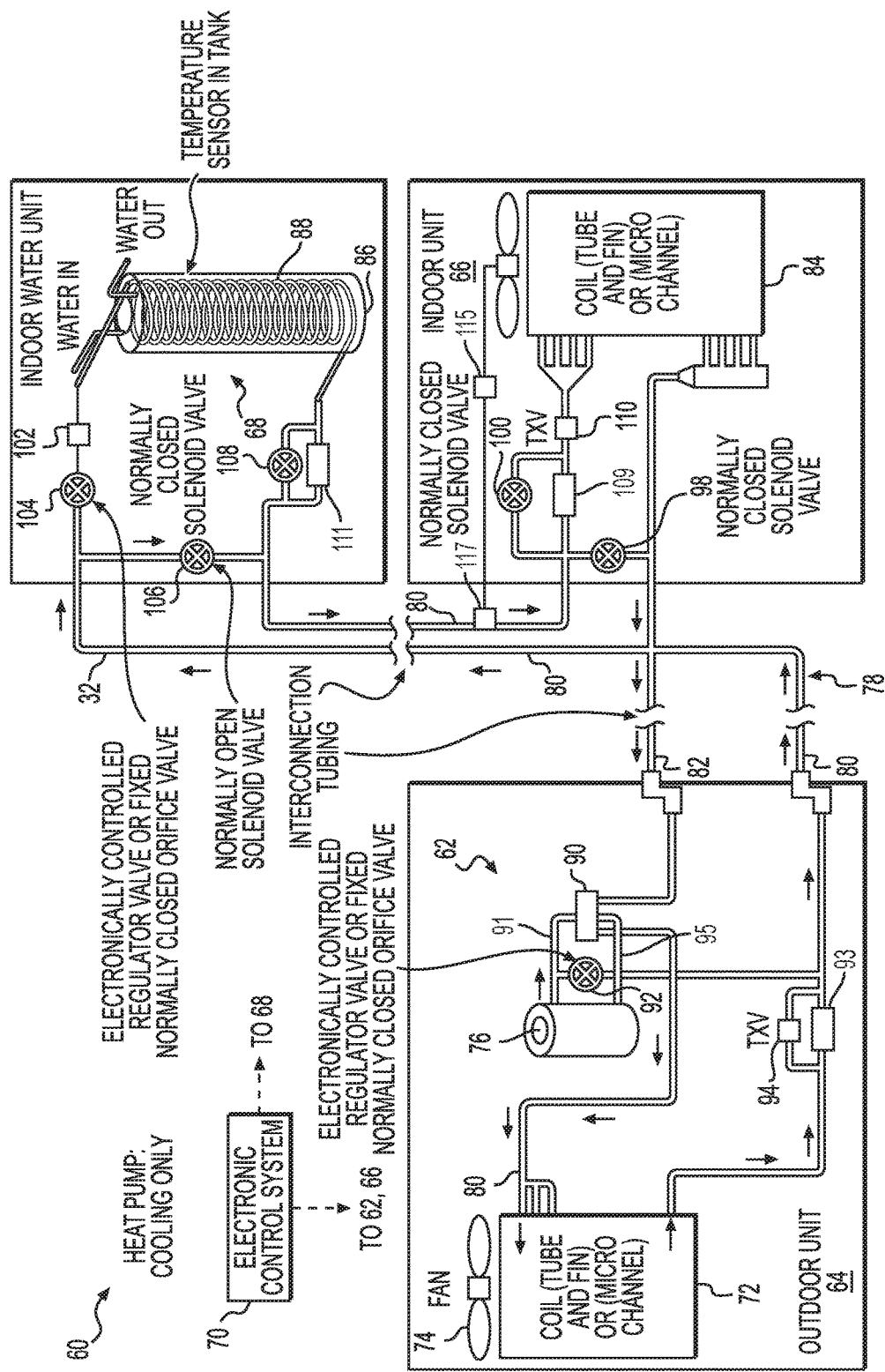
FIG. 4 is a schematic diagram of a an air conditioning system according to an embodiment of the present invention, with an air conditioning system providing only conditioned space air cooling.
Figure 5:
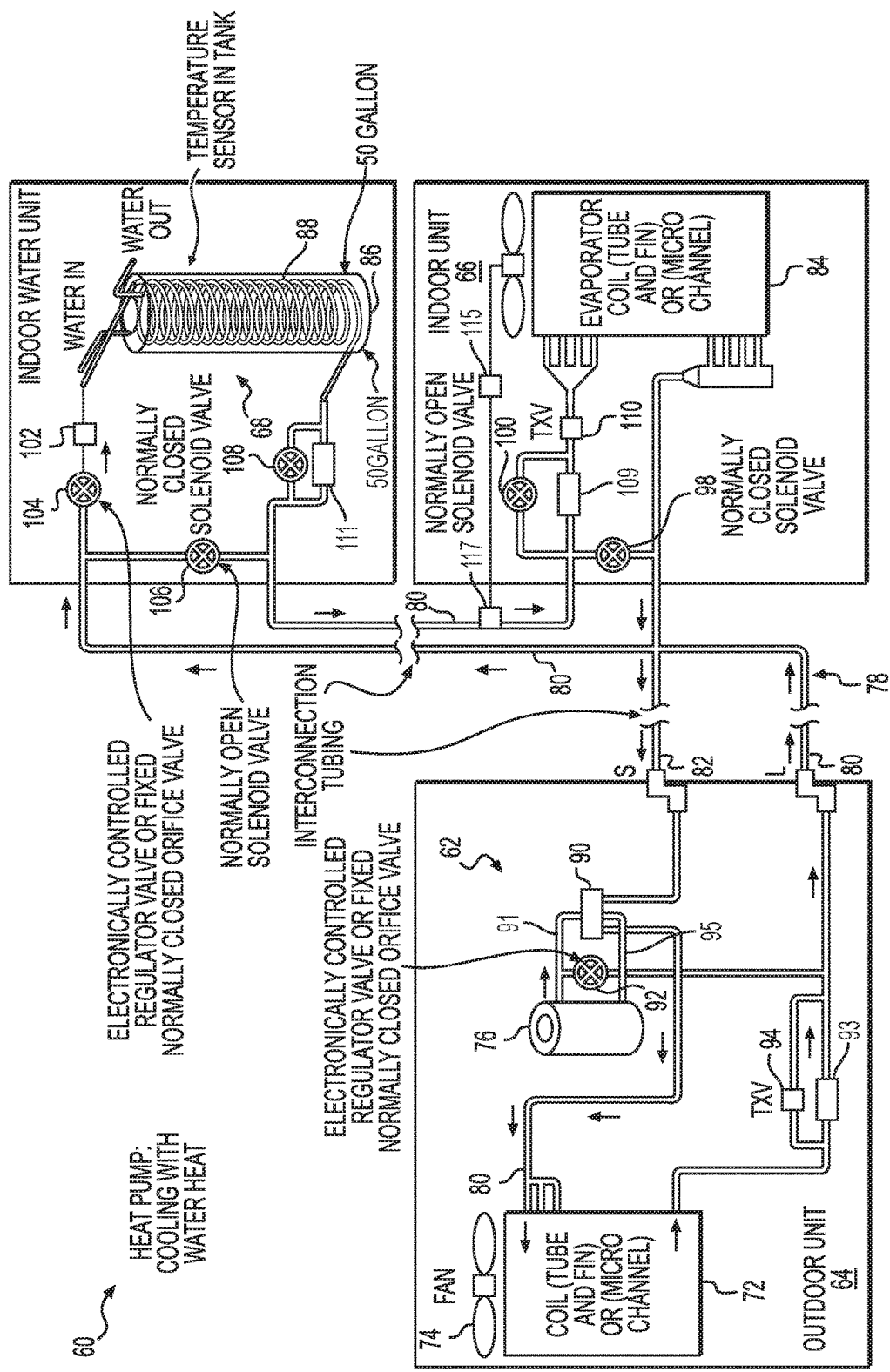
FIG. 5 is a schematic diagram of the system as in FIG. 4, but with the air conditioning system providing conditioned space air and providing refrigerant heat to a water heater.
Figure 6:
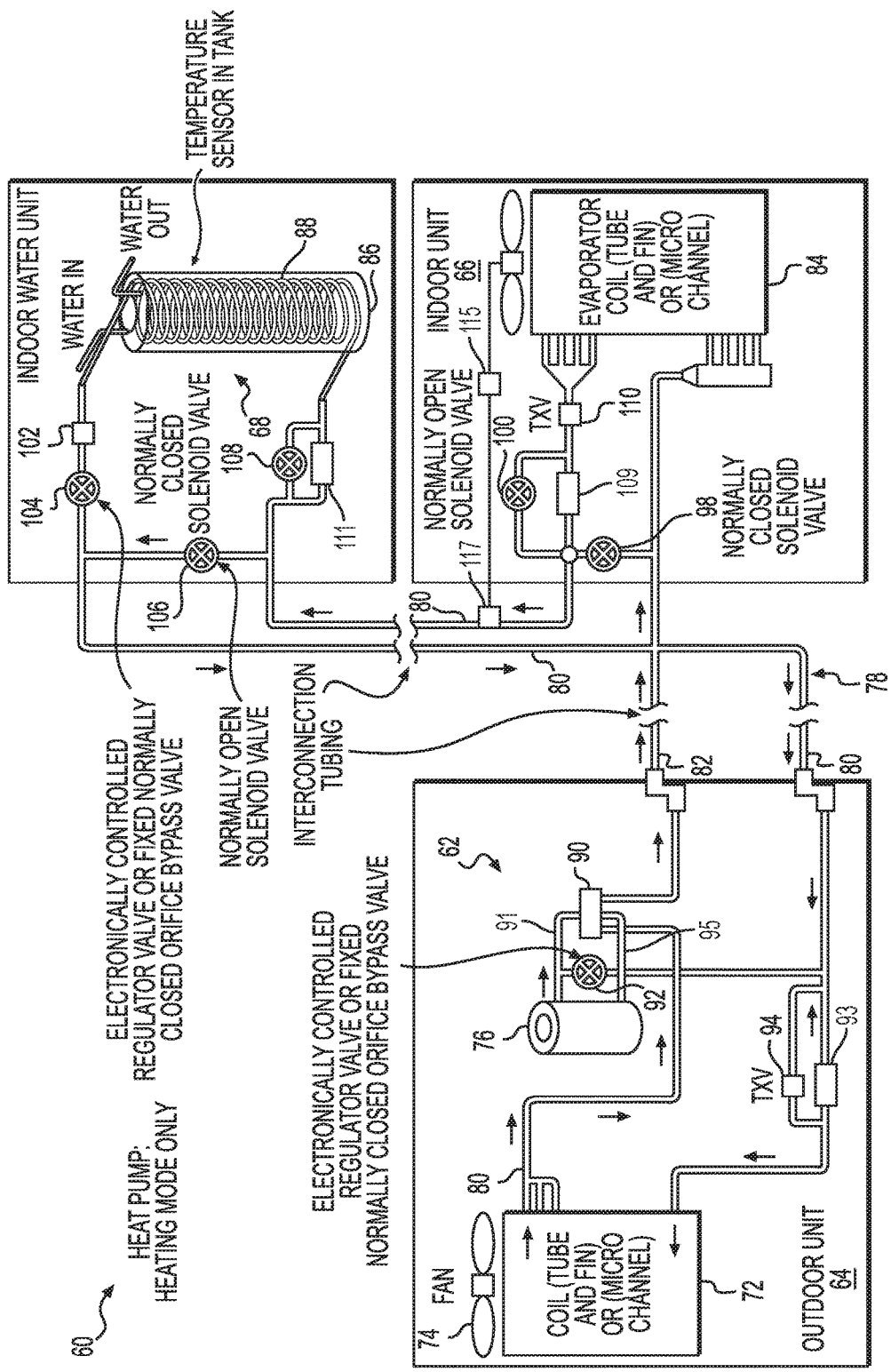
FIG. 6 is a schematic diagram of the system as in FIG. 4, but with the air conditioning system providing conditioned space air heating without providing refrigerant heat to a water heater.
Figure 7:
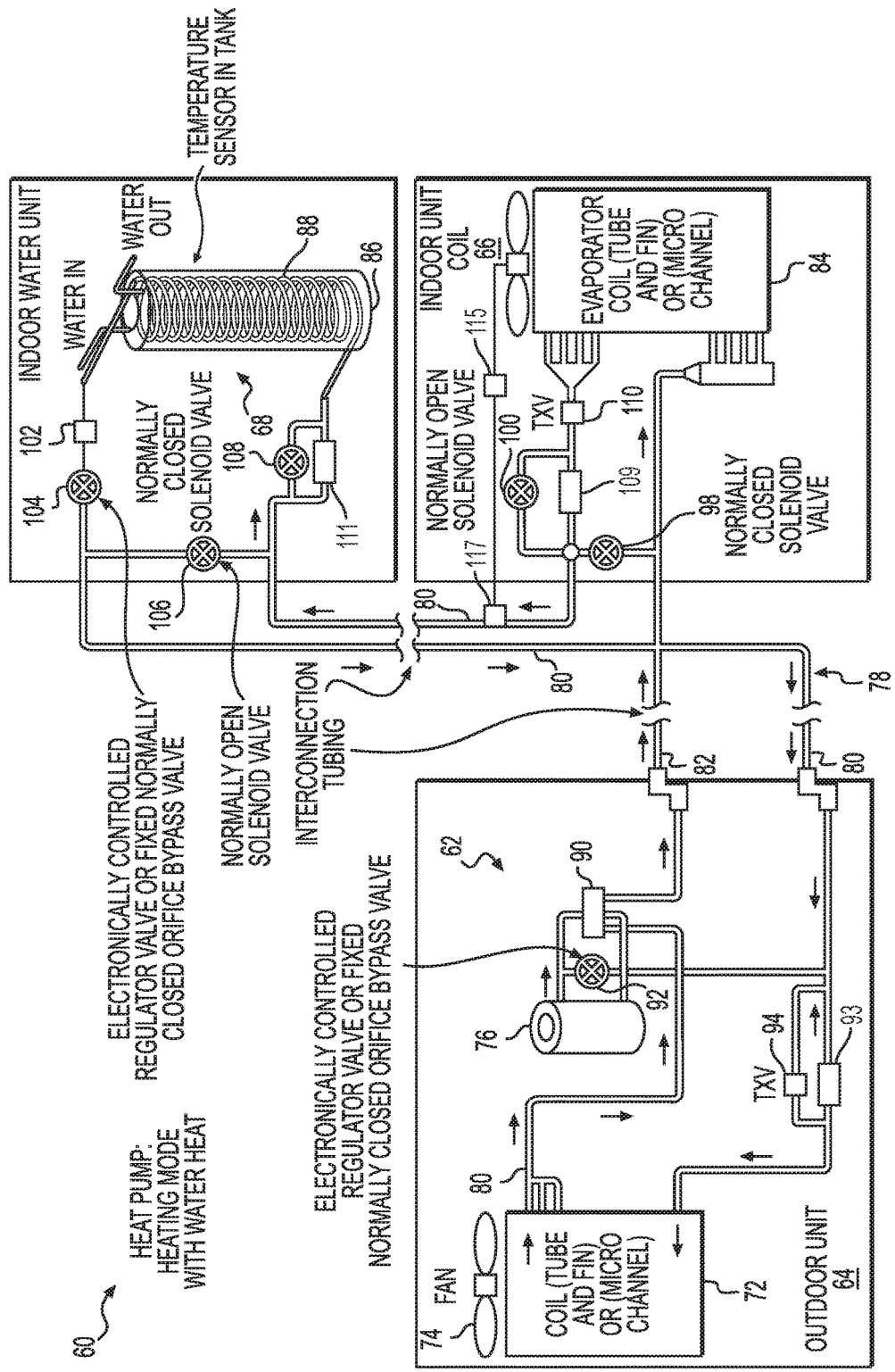
FIG. 7 is a schematic diagram of the system as in FIG. 4, but with the air conditioning system providing conditioned space air and providing refrigerant heat to a water heater.

An air conditioning system 60 embodying one or more principles of the present invention is schematically depicted in FIGS. 4-7 and includes (1) a heat pump 62 having an outdoor coil unit 64 and an indoor coil unit 66, and (2) an associated water heater 68 which, representatively, may be a gas-fired or electric water heater. In FIG. 4, heat pump 62 is in an air cooling-only mode. In FIG. 5, heat pump 62 is in an air cooling mode and further provides supplemental, refrigerant-based water pre-heating to water heater 68. In FIG. 6, heat pump 62 is in an air heating-only mode. In FIG. 7, heat pump 62 is in an air heating mode and further provides supplemental, refrigerant-based water pre-heating to water heater 68. The various functions of air conditioning system 60 are controlled by a schematically depicted electronic control circuit 70 (shown only in FIG. 4) which operates various subsequently described components of system 60.

As shown in FIGS. 4-7, outdoor coil unit 64 includes a coil 72 and associated fan 74, and a compressor 76. Coil 72 and compressor 76 are coupled, as shown, by a refrigerant tubing circuit 78 having line portions 80 and 82, to indoor unit coil 84 and to a heat conductive copper or aluminum tube dispensed within a PCM-filled volume within or about a metal tank portion 86 of water heater 68, as described above with respect to FIGS. 14-19, and serves as a refrigerant-to-PCM-to-tank water heat exchanger 88 for water heater 68.

Outdoor unit 64 has a reversing valve 90, an electronically controlled regulator valve 92, an expansion valve 94, and a check valve 93 (which can be considered as the expansion valve's inherent check valve) connected as shown in tubing circuit 78 and operatively linked to electronic control system 70. Indoor coil unit 66 has a normally closed solenoid valve 98 and a normally closed solenoid valve 100 connected across a check valve 109 as shown in tubing circuit 78 and operatively linked to electronic control system 70. The indoor unit also has an expansion valve 110, and the valve 100/109/110 assembly can be replaced by a parallel expansion/check valve as indicated at 93/94. Water heater 68 has a temperature sensor 102 in the refrigerant line, an electronically controlled regulator valve or normally closed solenoid valve 104, a normally open solenoid valve 106, and a normally closed solenoid valve 108 connected as shown in tubing circuit 78 and operatively linked to electronic control system 70, and temperature sensor(s) (not shown) positioned to sense water temperature and PCM temperature in the water heater.

Turning now to FIG. 4, with air conditioning system 60 in an air cooling-only mode, electronic control system 70 sets the previously described valve components in tubing circuit 78 in a manner such that compressor 76 causes refrigerant discharged therefrom to flow, via tubing portion 80 of tubing circuit 78, sequentially through condenser coil 72 to water heater 68, evaporator coil 84, and back to the compressor. More specifically, as hot gaseous refrigerant flows out from compressor 76 on an output line 91, control system 70 maintains solenoid valve 92 closed, so that all of the compressor's output refrigerant flows to reversing valve 90. Control system 70 sets reversing value 90 to direct the gaseous refrigerant flow from line 91 to tubing portion 80 and thereby to condenser coil 72. Since none of the refrigerant bypasses the condenser coil through valve 92 in this mode, all of the hot refrigerant from the compressor condenses in coil 72 and flows therefrom via check valve 93 out of this outdoor unit and to the indoor water heater.

At the water heater, control system 70 maintains solenoid valve 104 closed and solenoid valve 106 open, and the refrigerant bypasses heat exchanger 88 through open solenoid valve 106. The liquid refrigerant then flows through tubing portion 80, through check valve 109 and expansion valve 110 (the control system maintains solenoid valves 100, 98, and 108 closed, and a check valve 111 blocks flow from left to right in the perspective of FIG. 4) and into evaporator coil 84. As discussed above, the expansion valve lowers pressure of the liquid refrigerant, allowing the refrigerant to change phase from liquid to gas in the evaporator coil and draw required heat energy from air flowing over coil 84 due to the air handler fan, to thereby cool air in the conditioned space. Also as discussed above, positive and negative pressure contributed by compressor 76 in the refrigerant tubing line is sufficient so that the now-gaseous refrigerant flows back to compressor 76 over tubing line 82 through reversing valve 90, which fluidly connects input tubing line 82 to a compressor input tubing line 95.

Referring to FIG. 5, when a temperature sensor (not shown) of water heater 68 sends an output signal to electronic control system 70 indicating that the water temperature of water in tank 68 has reached or fallen below the water heater's low set point temperature (as stored in memory at electronic control system 70), and if the COP comparison favors the refrigerant heat exchanger, the control system repositions water heater regulator valve 104 and normally open solenoid valve 106 such that the refrigerant flows through heat exchanger 88 and back into tubing portion 80, thereby adding refrigerant heat to the tank water, to expansion valve 110. The settings of valves 104, 106, and 92 are the same as those for valves 44, 50, and 40, as discussed above with respect to FIG. 2. In addition, valves 108 and 100 remain closed, as refrigerant flows through their respective opposing check valves, and valve 98 remains closed. Refrigerant flowing through coil 84 changes phase to a gas, as discussed above with respect to FIG. 4, and gaseous refrigerant returns to compressor 76 via tubing 82 and 95.

Although not shown in FIG. 5, fan 74 is controlled by a variable fan speed controller (see FIG. 2) that is, in turn, responsive to a pre-programmed target temperature in water-heating mode to control the speed of fan 74 so that the refrigerant flowing from coil 72 and bypass valve 92 maintain the desired target temperature in tubing 80, as described above with regard to the embodiment of FIGS. 1 and 2. The target temperature may be selected as discussed above.

Similarly to operation of the embodiment discussed above with regard to FIGS. 1 and 2, control system 70 may select the water heating source based on the COP comparison (e.g. where data sets exist for the air conditioning modes of this embodiment) or may default to selection of the refrigerant heat exchanger to heat the water heater when the control system receives a temperature signal from the water heater indicating a need to heat water. Regardless of the method or of the heat source chosen, the control system thereafter continuously re-assesses the COP comparison and selects between the two alternative water heating sources based thereon, as described above.

It should be understood that the control system may change the system's operation modes between air cooling of the conditioned space and air heating of the conditioned space (or actuation from one mode to the other from start up), or to the inactive mode, based on operator control of the system or automatically. When the control system enters an air heating mode, and referring now FIG. 6, the control system changes reversing valve 90 so that the refrigerant flowing from the compressor through tubing 91 flows through valve 90 to tubing 82 that connects to indoor coil 84. Valve 98 remains closed. Coil 84, receiving the hot gaseous refrigerant from compressor 76, now acts as condenser, cooling the refrigerant so that it changes phase back to a liquid. Exiting coil 84, the liquid refrigerant bypasses expansion valve 110 through its internal check valve and flows through now-open solenoid valve 100 around check valve 109. Control system 70 maintains valve 106 open and valves 104 and 108 closed. Since check valve 111 and closed valve 108 otherwise block the refrigerant's flow into heat exchanger 88, refrigerant from coil 84 flows through valve 106 and through tubing 80 to outdoor unit 64. The control system maintains valve 92 closed. Thus, all refrigerant from the indoor unit flows through expansion valve 94 and into outdoor coil 72. Expansion valve 94 (which is bypassed by its internal check valve 93 when the system operates in air cooling modes) lowers the refrigerant's pressure, causing coil 72 to act as an evaporator that draws heat from air passing over the coil as a result of operation of fan 74. The now-warmer refrigerant flows from coil 72 to expansion valve 90, which directs the refrigerant flow to the compressor's input tubing line 95.

Referring now to FIG. 7, if the electronic control system 70 receives a signal from the temperature sensor at water tank 86 indicating that the tank's water temperature has reached or fallen below the water heater's low set point while system 60 is operating in an air heating mode, control system 70 decides whether to activate the heat exchanger or the water heater heat source, e.g., based on the data sets/COP comparison as described above, or by default to the heat exchanger followed by the data sets/COP comparison. Assuming the control system initially activates the heat exchanger, the control system appropriately adjusts valves 104, 106, and 108 in a manner such that the refrigerant flow to water heater 68 flows through coiled tubing heat exchanger 88. More specifically, control system 70 closes valve 106 and valve 92 and opens valves 104, 108, 100, and 98.

As discussed above, indoor unit 66 includes an air handling unit having a fan that draws air over coil 84. As indicated in FIG. 7, unit 66 also includes a variable speed fan control unit 115 in communication with control system 70 and a temperature sensor 117 that detects refrigerant temperature in the flow of refrigerant combined from the output of coil 84 and bypass valve 98. As in the air cooling/water heating mode, when the system is in air heating/water heating mode, heat exchanger coil 88 acts as a sub-cooling or sub-condensing coil, sharing the condensing function with the system condenser, the difference between the two modes of operation being that in air heating mode, coil 84, rather than coil 72, is the system condenser. As in the air cooling/water heating mode, the system in air heating/water heating mode diverts some of the hot gaseous refrigerant from compressor 76 to coil 88, bypassing the condensing coil, in order to contribute heat to the heat exchanger. And as in the air cooling mode, this is accomplished in the air heating mode by a valve that bypasses the condenser coil, in this instance valve 98. That is, valve 98 serves the function in air heating/water heating mode that valve 92 serves in air cooling/water heating mode.

As discussed above with regard to valve 92 in the air cooling/water heating mode, the opening of valve 98 in air heating/water heating mode allows hot gaseous refrigerant to flow through the bypass path, but because refrigerant flowing through condenser coil 84 is cooled, and thus has lower flow resistance than the hot refrigerant, more refrigerant tends to flow through the condenser coil than through the bypass when the air handler fan is operating at its normal speed. Accordingly, when control system 70 actuates system 60 to operate in air heating/water heating mode, the control system instructs variable fan speed controller 115 to variably control the air handler fan speed in response to temperature of the combined refrigerant flow detected at 117 to maintain the refrigerant flow at 117 at a target temperature that is pre-programmed to controller 115 and/or control system 70. The target temperature in air-heating mode may be selected independently of the air-cooling mode target temperature, as system conditions can be different. Thus, while the system actuates refrigerant heat exchanger 88, the air handler fan generally slows in speed, thereby increasing resistance to refrigerant flow through the condenser coil and forcing more refrigerant through bypass valve 98. The bypass refrigerant remains in a hot, gaseous state so that the combination of gaseous refrigerant from valve 98 and liquid refrigerant from coil 84 is in a dual-phase state as it flows to heat exchanger 88.

This refrigerant flows through open valve 108, around check valve 111, and through heat exchanger coil 88. This transfers heat from the refrigerant to water in the water tank via the PCM and completes the condensing process, so that the refrigerant leaving coil 88 through open valve 104 is in a fully liquid state. The liquid refrigerant continues its flow through tubing 80 and valve 94, around check valve 93, to expansion valve 113 and evaporator coil 72. From the evaporator coil, warmer, gaseous refrigerant flows through tubing 80, reversing valve 90, and input tubing 95 to compressor 76, and the cycle repeats.

Control system 70 makes the COP comparison as described above to determine when to alternatively operate refrigerant heat exchanger 88 or the water heater heat source. As when the system is operating in air cooling mode, the use of refrigerant heat exchanger 88 in air heating mode will generally be more efficient when the water in tank 86 is at a lower temperature. Thus, when control system 70 receives a signal from the water heater temperature sensor that the water heater is at or below its low set point temperature, control system 70 may default to operation of refrigerant heat exchanger 88 and thereafter continuously examines the efficiency comparison to determine when to switch to the water heater's operation. Again, since the target temperature to which fan controller 17 controls the refrigerant input to the heat exchanger is typically below the water heater's high set point temperature, this typically means that the refrigerant flow heat exchanger acts as a pre-heater and that final heating is effected by the water heater heat source.

It should also be recognized, in view of the present disclosure, that the reduction in the air handler fan speed during operation of refrigerant heat exchanger 88 corresponds to a reduction of heat provided to the conditioned space, thereby corresponding to a reduction in system efficiency. When the system operates in air cooling/water heating mode, the system does not experience a similar efficiency reduction, in that because conditioned air is delivered to the conditioned space from the evaporator coil rather than from the condenser coil, energy contribution to the conditioned air is relatively unaffected by the refrigerant bypass around the condenser. As apparent from the discussion above, control system 70 may therefore switch from use of heat exchanger 88 to the use of the water heater's heat source earlier in air heating/water heating mode than in air cooling/water heating mode.

In a still further embodiment, variable speed fan controller 115 and sensor 117 may be omitted from the system, and the air handler fan may operate at normal speed during actuation of heat exchanger 88 in air heating mode. This avoids the reduction in system efficiency caused by decrease in fan speed, although because of the resulting reduction in diversion of hot refrigerant to the heat exchanger through valve 98, the heat exchanger would correspondingly contribute less heat to the water heater, thereby reducing system efficiency. It will therefore be appreciated that the decision whether to utilize variable fan speed, and if so, also the selection of the target refrigerant temperature at the output of the bypass valve and the condenser coil, will influence system efficiency and, therefore, the balance between use of refrigerant heat exchanger 88 and the water heater heat source. It will also be understood that, in both air heating and air conditioning modes, decisions regarding use of fan reduction can be made, and operating parameter values optimized, through calibration of the particular air conditioning system.

In the discussion of the above-described embodiments, the control system actuates the refrigerant heat exchanger when the air conditioning system is operating either in an air cooling mode or an air heating mode. In certain embodiments, the control system only actuates the heat exchanger during an active mode of the air conditioning system, but in other embodiments the control system also actuates the refrigerant heat exchanger when the system is in an inactive mode, i.e. when running neither in air cooling mode nor air heating mode. In such embodiments, and referring for example to the system of FIGS. 4-7, if control system 70 receives a signal from the water heater temperature sensor indicating that water in the water heater has reached or fallen below the heater's low temperature set point, the control system decides whether to activate the heat exchanger or the water heater heat source, e.g., based on the COP comparison as described above, or by default to the heat exchanger. Assuming the decision is to activate the heat exchanger, the control system arranges the valves in the air conditioning system so as to operate in air heating/water heating mode, as discussed above with respect to FIG. 7, and operates the air conditioning system in the manner described above with regard to FIG. 7, except that the control system deactivates the air handler fan so that no air is drawn across coil 84 and no conditioned air is provided to the conditioned space. Correspondingly, the variable fan speed controller is inoperative. This tends to force a greater volume of hot refrigerant from the compressor through bypass valve 98, but the refrigerant flow is thereafter the same as discussed above with regard to FIG. 7. The control system does operate fan 24, since the evaporator function is needed to complete the refrigerant cycle. Since the evaporator function is needed, the control system does not select an air cooling set up, as such arrangement would cause conditioned air to be forced into the conditioned space.

In this water heating-only mode of operation, the reduced condenser capacity causes the air conditioning system to remove less heat from the refrigerant between the compressor and the evaporator than in the air conditioning modes. The increased refrigerant heat corresponds to increased flow resistance in the refrigerant circuit and, therefore, to increased compressor discharge pressure. Depending on the system configuration, this may, in turn, decrease system efficiency or possibly inhibit the compressor's operation so that use of the refrigerant flow heat exchanger does not occur or occurs for only a short time. Thus, in embodiments utilizing a water heating-only mode, compressor 76 may be a variable speed compressor so that control system 70 may reduce compressor speed when heating water with the heat exchanger but not conditioning air. For example, typical residential air conditioning systems have compressors ranging in capacity from 16,000 to 60,000 BTU/hr. In a non-air conditioning mode with water heating, however, control system 70 would lower a variable speed compressor to operate at a lower capacity, e.g. approximately 10,000 BTU/hr in a typical residential configuration. As in the air conditioning/water heating operational modes discussed above, control system 70 in a water heating-only mode again determines whether and when to switch between heating water with the refrigerant heat exchanger and heating water with the water heater heat source based on the COP comparison.

In the embodiments described above, the refrigerant heat exchanger coil is disposed downstream of the system condenser. In the embodiments discussed below with respect to FIGS. 8-13, however, the heat exchanger coil is disposed upstream from the system condenser, between the system condenser and the compressor. In these embodiments, the heat exchanger coil reduces heat of the hot gaseous refrigerant output by the compressor (and transfers this heat to the water heater via the PCM, as described above with respect to FIGS. 14-19), but it does not condense the refrigerant to a liquid phase. Because the heat exchanger coil receives hot refrigerant directly from the compressor, it is unnecessary to bypass the compressor output around the condenser or, therefore, to reduce condenser fan speed in order to encourage such bypass flow. That is, the system condenser fan operates at normal speed whether or not the refrigerant heat exchanger is active. This tends to increase system efficiency as compared to the embodiments described above with regard to FIGS. 1-7. In certain environments, however, the embodiments described with regard to FIGS. 1-7 may be more convenient to install, particularly into an existing air conditioning system as a retrofit.

Figure 8:
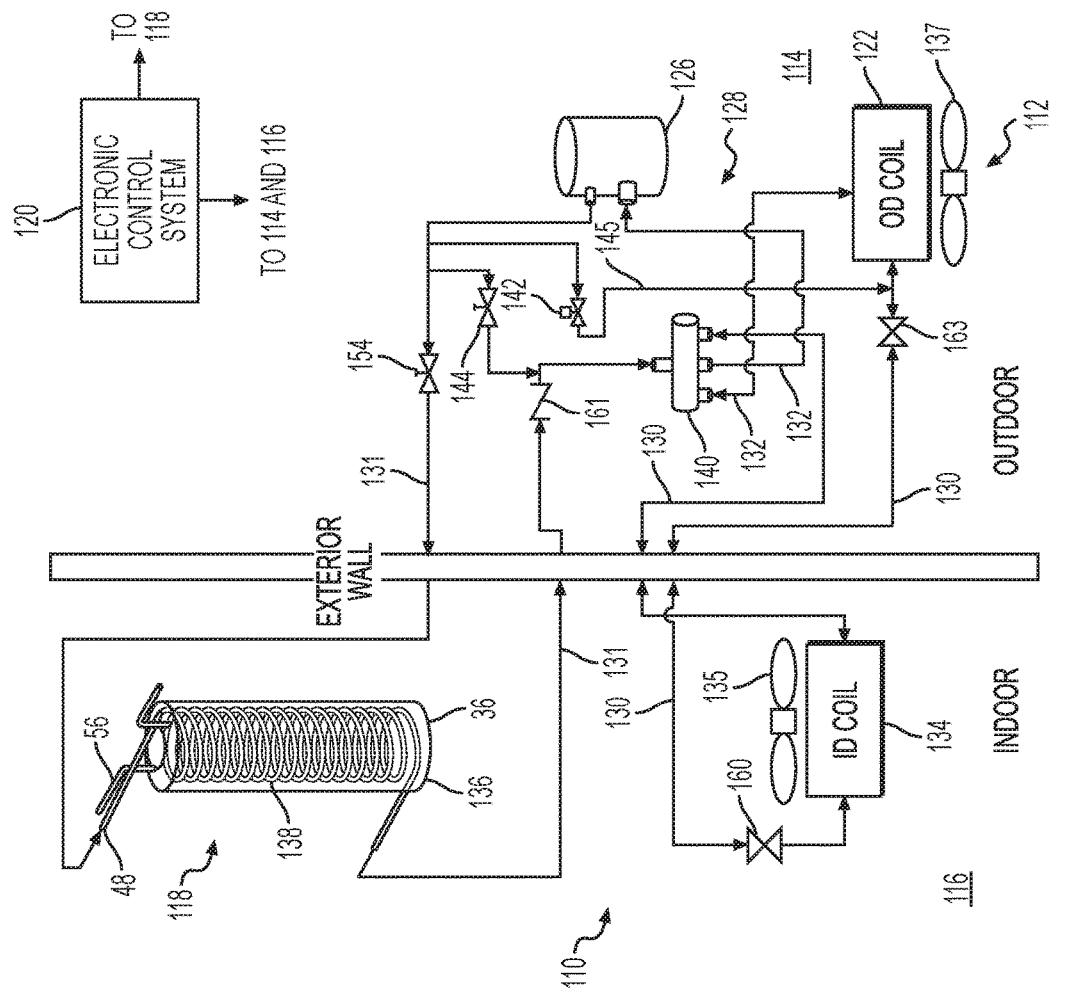
FIG. 8 is a schematic diagram of an air conditioning system according to an embodiment of the present invention.

FIG. 8 schematically depicts an air conditioning/water heater system 110 embodying principles of an embodiment of the present invention. System 110 includes (1) an air conditioning system 112 having an outdoor coil unit 114 and an indoor coil unit 116, and (2) and associated water heater 118 which, representatively, may be a gas-fired or electric water heater. In FIG. 8, air conditioning system 112 is arranged so that it may operate alternatively in air heating and air cooling modes, and may therefore also be described as a heat pump. The various functions of the air conditioning/water heater system 110 are controlled by a schematically depicted electronic control circuit 120 (shown only in FIG. 8) that operates various subsequently described components of overall system 110.

Outdoor unit 114 includes an outdoor coil 122 and associated fan 137 and a compressor 126. Condenser coil 122 and compressor 126 are coupled, as shown, by a refrigerant tubing circuit having a line portion 130 between coil 122 and a reversing valve 140 through an indoor unit coil 134 and expansion valve 160, a line portion 131 between reversing valve 140 and compressor 126 via a heat conductive copper or aluminum tube disposed within a PCM-filled volume within or about a metal tank portion 136 of water heater 118 and serving as a refrigerant-to-PCM-to-tank water heat exchanger 138 for water heater 118, and a line portion 132 between reversing valve 140 and each of coil 122 and compressor 126.

In addition to reversing valve 190, outdoor unit 114 includes an electronically controlled regulator valve 142, an expansion valve 153 at an input to outdoor coil 122 (bypassed when receiving outflow from coil 122), solenoid valves 144 and 154, and a check valve 161. Valves 154, 144, 142, and 140 are in electrical communication with electronic control system 120, which controls the actuation of these valves as discussed herein.

Figure 9:
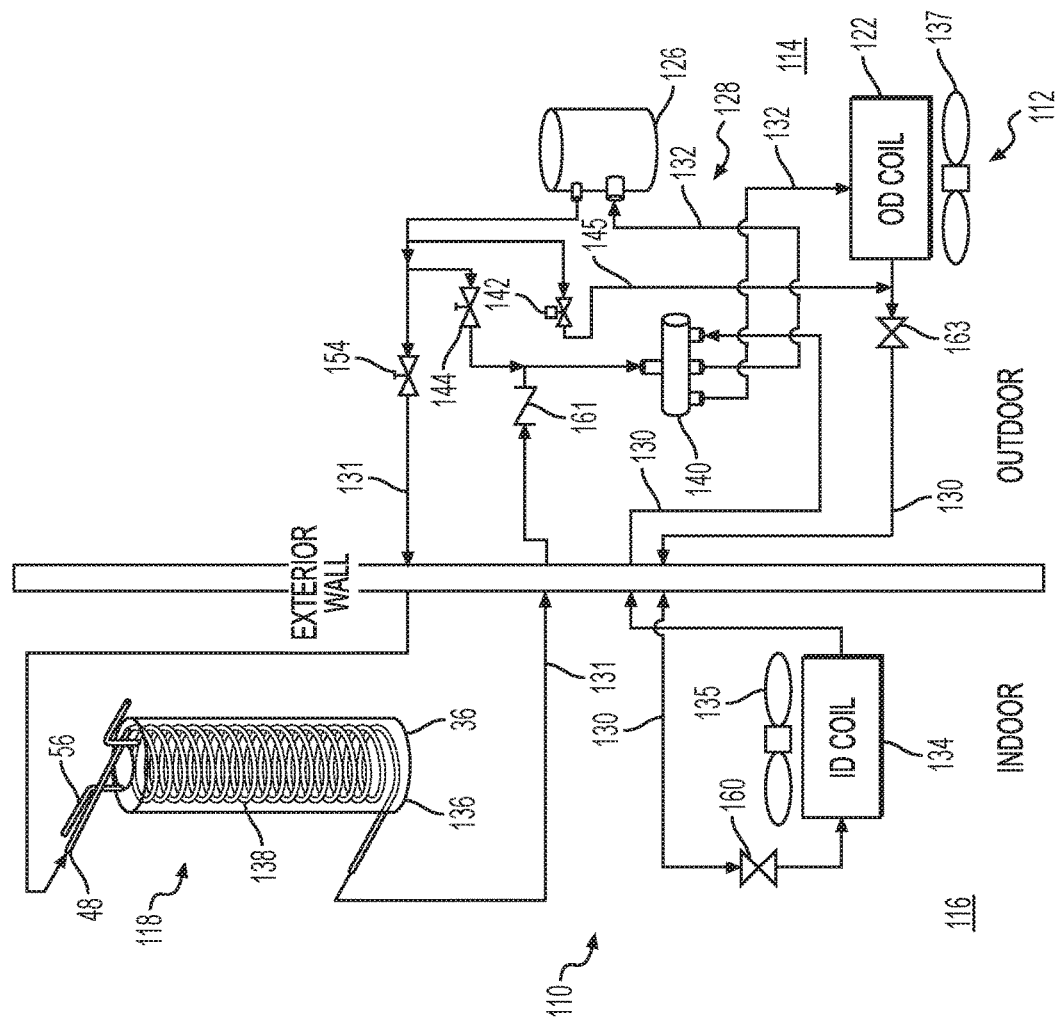
FIG. 9 is a schematic diagram of the system as in FIG. 8, but with the air conditioning system providing conditioned space air cooling without providing refrigerant heat to a water heater.

Turning now to FIG. 9, with the air conditioning/water heater system 110 in an air cooling only mode, electronic control system 120 (FIG. 8) sets valves 154, 144, and 140 in the overall tubing circuit in a manner such that compressor 126 causes refrigerant discharged therefrom to flow, via tubing portion 131, to the entry point of a tubing loop that includes heat exchanger 138 wrapped around tank 136 of water heater 118. Electronic control system 120 has closed valve 154 and opened valve 144, so that hot gaseous refrigerant flowing from compressor 126 bypasses heat exchanger 138 and flows directly to reversing valve 140. Control system 120 has set reversing valve 140 so that the reversing valve directs this refrigerant flow, via tubing line 132, to outdoor coil 122, which condenses the refrigerant in cooperation with fan 137 as discussed above. The refrigerant exits coil 122 via tubing line 130 (bypassing expansion valve 163) and enters indoor coil 134 via expansion valve 160. As discussed above, and as should be understood, expansion valve 160 lowers the pressure of the refrigerant in coil 134 so that coil 134 functions as an evaporator. An air handler fan 135 adjacent coil 134 causes air to flow over coil 134 and into the conditioned space. As discussed above, the refrigerant's change of phase in the evaporator coil from liquid to gas draws heat energy from this air, thereby causing the re-circulating air to cool the conditioned space. The now gaseous and warmer refrigerant flows from coil 134 via tubing portion 130 to reversing valve 140, which directs the gaseous refrigerant flow, via tubing portion 132, back to compressor 126, and the cycle repeats.

Figure 11:
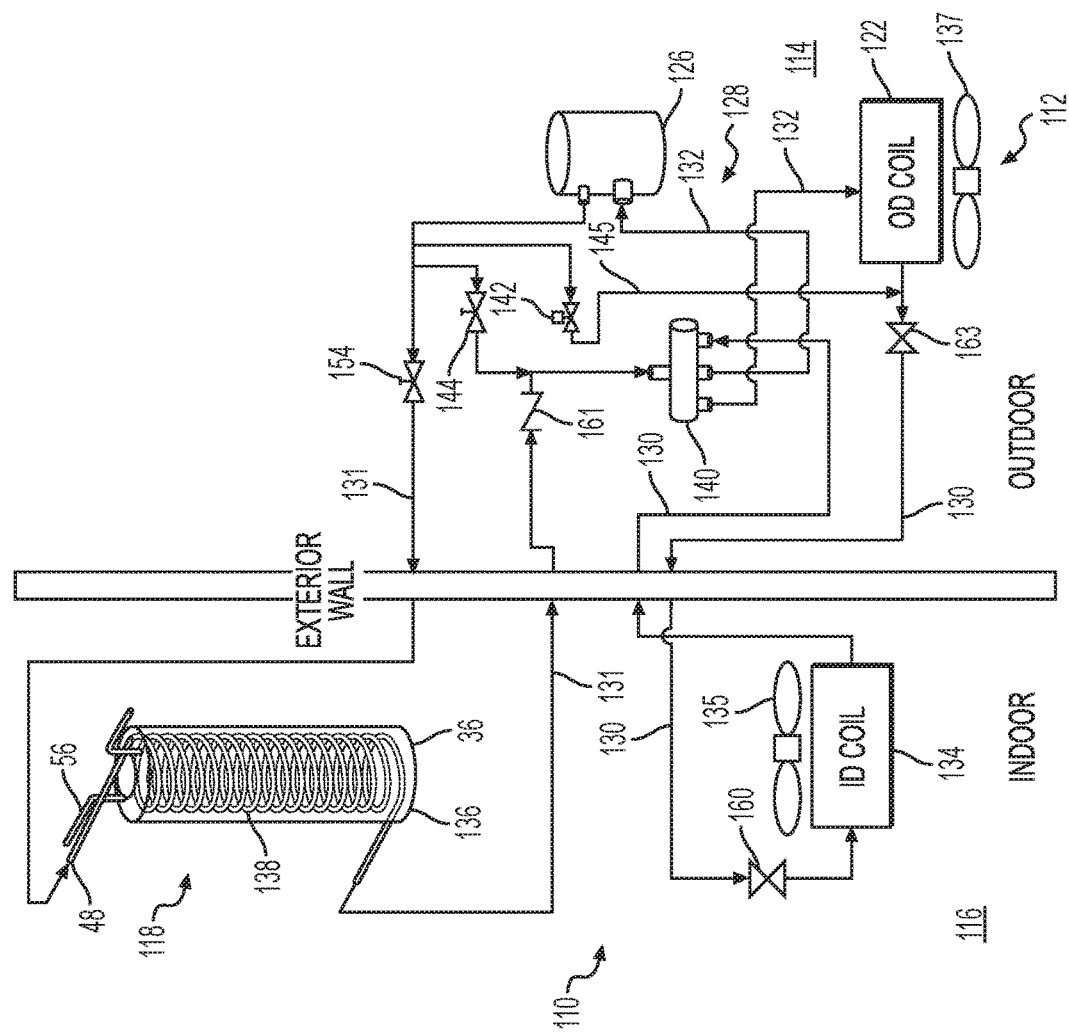
FIG. 11 is a schematic diagram of the system as in FIG. 8, but with the air conditioning system providing conditioned space air and providing refrigerant heat to a water heater.

Referring to FIG. 11, when the system is operating in air cooling mode as described above with regard to FIG. 9, and when a temperature sensor (not shown) of water heater 118 outputs a signal to electronic control system 120 indicating to the electronic control system that the water heater water has reached or fallen below the water heater's low set point temperature as stored in the electronic control system, the control system decides whether to activate the heat exchanger or the water heater heat source, e.g., based on the COP comparison as described above or by default to the heat exchanger. Assuming the decision is to activate the heat exchanger, the electronic control system closes valve 144 and opens valve 154, thereby activating refrigerant heat exchanger 138. Reversing valve 140 remains in the same setting as discussed with regard to FIG. 9. Under these conditions, hot gaseous refrigerant output from compressor 126 flows to heat exchanger 138 of water heater 118 via tubing portion 131, bypassing valve 144, and ultimately to reversing valve 140 via check valve 161. The refrigerant flows from the reversing valve to outdoor condenser coil 122, and then to expansion valve 160, indoor coil 134, reversing valve 140, and back to compressor 126, as discussed above with respect to FIG. 9.

Once the electronic control system actuates use of heat exchanger 138 or the water heater heat source, the control system continuously assesses the data sets/COP comparison. If the resulting ratio drops below 1.0, the control system deactivates the initially selected heat source and activates the other heat source. As noted above, system 110 (with heat exchanger 138 active) is generally more efficient than the system described above with respect to FIG. 2 or FIG. 5, in that reduction of fan speed for condenser coil 122 is unnecessary in air conditioning/water heating mode. Counterbalancing that positive efficiency effect is the longer refrigerant tubing line 131 needed between the compressor and the water heater, but this effect is often offset and even overcome by the increase in efficiency caused by the cooling effect the refrigerant experiences as it travels through heat exchanger 138. Accordingly, in most instances, operation of the system illustrated in FIG. 11 results in a positive system efficiency ratio, as compared to operation of the system and water heater heat source independently of each other, for a longer rise in temperature of water in water heater tank 136 than does the systems described above with regard to FIG. 2 and FIG. 5. In addition, since the water heater receives hot gaseous refrigerant directly from compressor 126, without need to regulate the refrigerant temperature being directed to the heat exchanger to a lower target temperature, as described above with regard to FIGS. 2 and 5, the heat exchanger illustrated in FIG. 11 can transfer more heat to the water heater, thereby maintaining a positive contribution to system efficiency over a longer temperature range. Nonetheless, if the refrigerant flowing from the compressor to heat exchanger 138 is unable to bring the tank water to the water heater's high temperature set point, the efficiency comparison will eventually favor operation of the water heater's heat source, causing the system to deactivate water heater heat exchanger 138 and activate the water heater's inherent heat source. That is, under such circumstances, the water heater inherent heat source will always bring the water heater water to the final high set point, and heat exchanger 138 serves as a pre-heater.

Electronic control system 120 monitors pressure at the output of compressor 12 and, if the monitored pressure exceeds a predetermined pressure (provided by the compressor manufacturer or by user selection, for example after a calibration process), control system 120 may switch valve 142 from a closed to an opened state, allowing refrigerant flow through a tubing portion 145, bypassing heat exchanger 138 and condenser coil 122, to the lower pressure of the evaporator. In one embodiment, and depending on the compressor capacity, control system 120 may selectively open proportional valve 142 whenever the compressor output pressure reaches or exceeds 550 psi. As will be understood in the context of the present disclosure, this reduces system efficiency, in that it diverts heat from transfer to the water heater and reduces the evaporator efficiency, and accordingly valve 142 is metered to minimize its impact.

Figure 10:
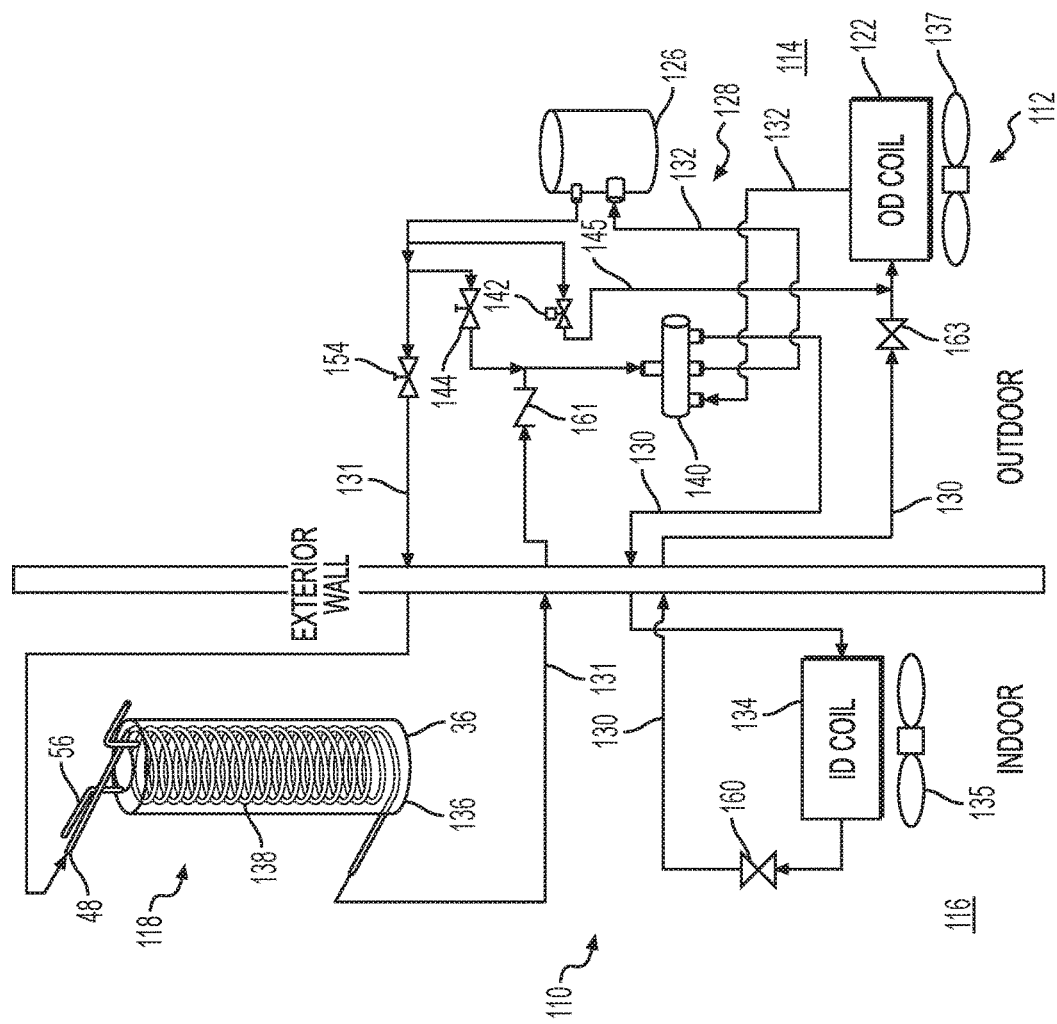
FIG. 10 is a schematic diagram of the system as in FIG. 8, but with the air conditioning system providing conditioned space air heating without providing refrigerant heat to a water heater.

If control system 120 changes, either by manual or electronic control, from air cooling to air heating modes, without water heating and with reference to FIG. 10, control system 120 closes valve 154, opens valve 144, and sets reversing valve 140 to direct refrigerant flow from tubing line 131 to indoor coil 134 via tubing line 130 and to direct refrigerant flow from coil 122 via line 132 back to compressor 126 via tubing line 132. In operation, hot gaseous refrigerant flows from compressor 126 through tubing line 131 and open valve 144, bypassing heat exchanger 138 due to closed valve 154. Reversing valve 140 directs the gaseous refrigerant to indoor coil 134 via tubing line 130. Coil 134 acts as a condenser coil, cooling and condensing the refrigerant to liquid phase as air handler fan 135 moves air over the coils and into the conditioned space. The re-circulating building air draws heat energy from the refrigerant as it condenses, thereby providing a heating effect to the conditioned space. Leaving coil 134 through tubing line 130 (and bypassing expansion valve 160), the now-liquid refrigerant flows to coil 122 through expansion valve 163. The expansion valve lowers the refrigerant's pressure, causing outdoor coil 122 to act as an evaporator, in which the refrigerant changes phase to a gas and draws heat energy from outdoor ambient air drawn over the coils by outdoor unit fan 137. The now-warm gaseous refrigerant flows from coil 122 to reversing valve 140, which directs the refrigerant flow back to compressor 126 via tubing line 132, and the cycle repeats.

Figure 12:
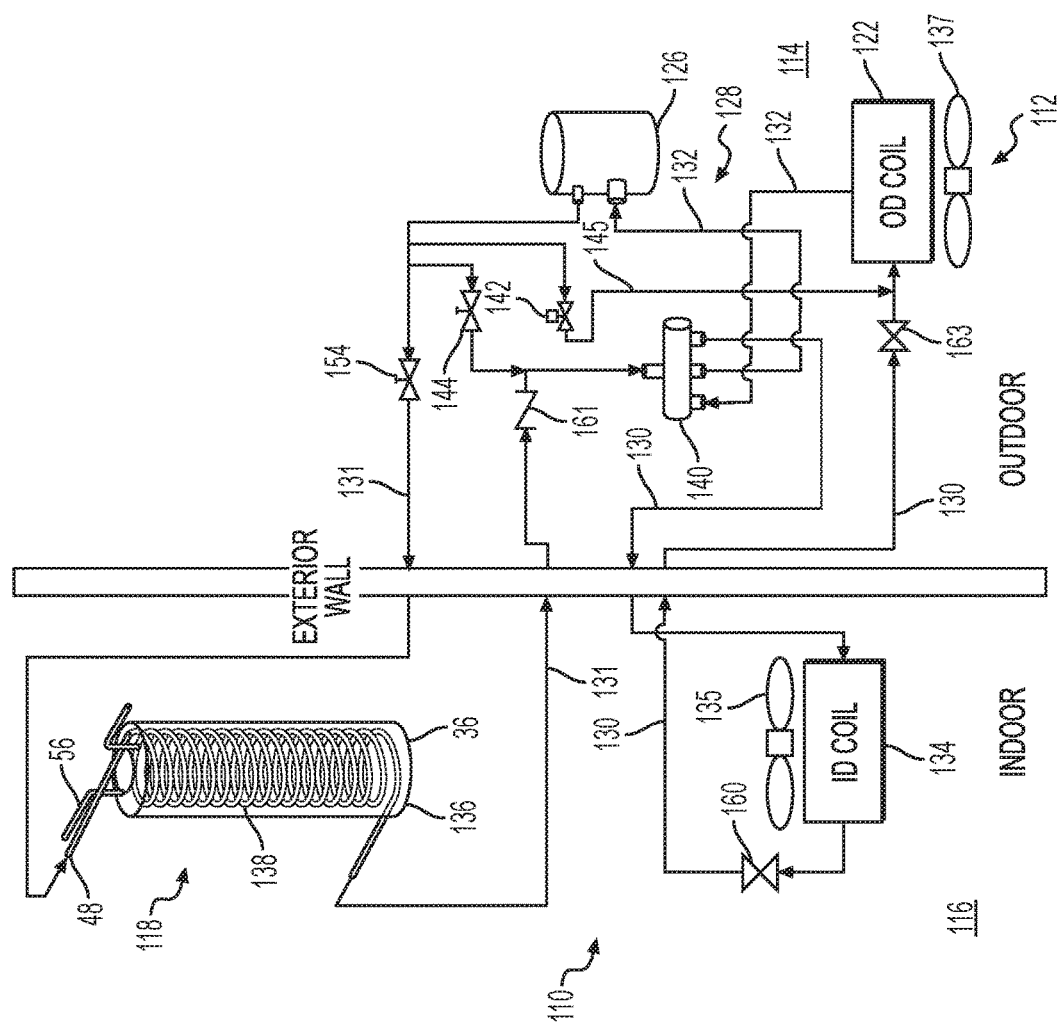
FIG. 12 is a schematic diagram of the system as in FIG. 8, but with the air conditioning system providing conditioned space air and providing refrigerant heat to a water heater.

Referring now to FIG. 12, when electronic control system 120 receives a signal from the water heater water temperature sensor (not shown) indicating that the water heater water temperature has fallen below the water heater's low set point, when the air conditioning system is in air heating mode as discussed above with regard to FIG. 10, control system 120 decides whether to activate the heat exchanger or the water heater heat source, e.g. based on the data sets/COP comparison as described above, or by default to the heat exchanger. Assuming the decision is to activate the heat exchanger, the control system closes valve 144 and opens valve 154, thereby activating heat exchanger 138 by including the heat exchanger and its related portion of tubing section 131 in the refrigerant flow loop. As described above, this causes hot gaseous refrigerant to flow from compressor 126 to and through heat exchanger coil 138 via tubing section 131 and thereafter to reversing valve 140 via check valve 161. The refrigerant's flow from reversing valve 140, to indoor coil 134, expansion valve 163, outdoor coil 122, reversing valve 140, and back to compressor 126 occurs as discussed above with regard to FIG. 10.

Again, when electronic control system 120 receives the signal from the water heater water temperature sensor indicating that water heating is needed, the electronic control system may initially activate refrigerant heat exchanger 138 rather than the water heater's inherent heat source, when the air conditioning system is operating in either air heating mode or air cooling mode, by default or by the COP comparison. FIGS. 9 and 11 illustrate the transition from air cooling-only mode to air cooling/water heating mode, while FIGS. 10 and 12 illustrate the transition from air heating-only mode to air heating/water heating mode. Continuing the discussion of the latter transition, once the electronic control system has actuated the refrigerant heat exchanger, the electronic control system thereafter continuously monitors the COP comparison of system efficiency with operation of refrigerant water heater 138, and without operation of the water heater's heat source, to system efficiency with refrigerant flow heat exchanger 138 deactivated and the water heater's inherent heat source activated. If this ratio drops below 1.0 as the system operates, the electronic control system deactivates refrigerant flow heat exchanger 138 (by closing valve 154 an opening valve 144), and activates the water heater's inherent heat source. As in all of the examples described herein, electronic control system 120 continues to monitor the water temperature output signal, and if the ratio rises above 1.0 and persists for a predetermined time will switch back to activation of the refrigerant flow heat exchanger. When the water heater water temperature rises to the water heater's high set point, the water heater heat source may be deactivated by a control system on the water heater that is independent of electronic control system 120, or the heat source may be deactivated by control system 120. As discussed above with regard to air cooling mode, the temperature of refrigerant flowing from compressor 126 is also a limiting factor, as compared to the water heater's high set point. If the compressor's output refrigerant temperature is below the water heater's high set point, refrigerant flow heat exchanger 138 is always a pre-heating device. If the compressor refrigerant output temperature is higher than the water heater high set point, it is possible for refrigerant flow heat exchanger 138 to bring the water heater fully to its high set point.

As will be apparent in view of the present disclosure, operation of refrigerant flow heat exchanger 138 in an air heating/water heating mode, as described with regard to FIG. 12, results in the removal of heat from the refrigerant flow at heat exchanger 138 that might otherwise be removed at coil 134 for contribution to conditioned air for the conditioned space. This may result in a reduced system efficiency as compared to the operation of the system in an air cooling/water heating mode, thereby resulting in a shorter duration of operation of the refrigerant heat exchanger in air heating/water heating mode than in a air cooling/water heating mode.

Valve 142 is operated by control system 120 in this mode in the same manner as discussed above with respect to FIGS. 9 and 11.

Figure 13:
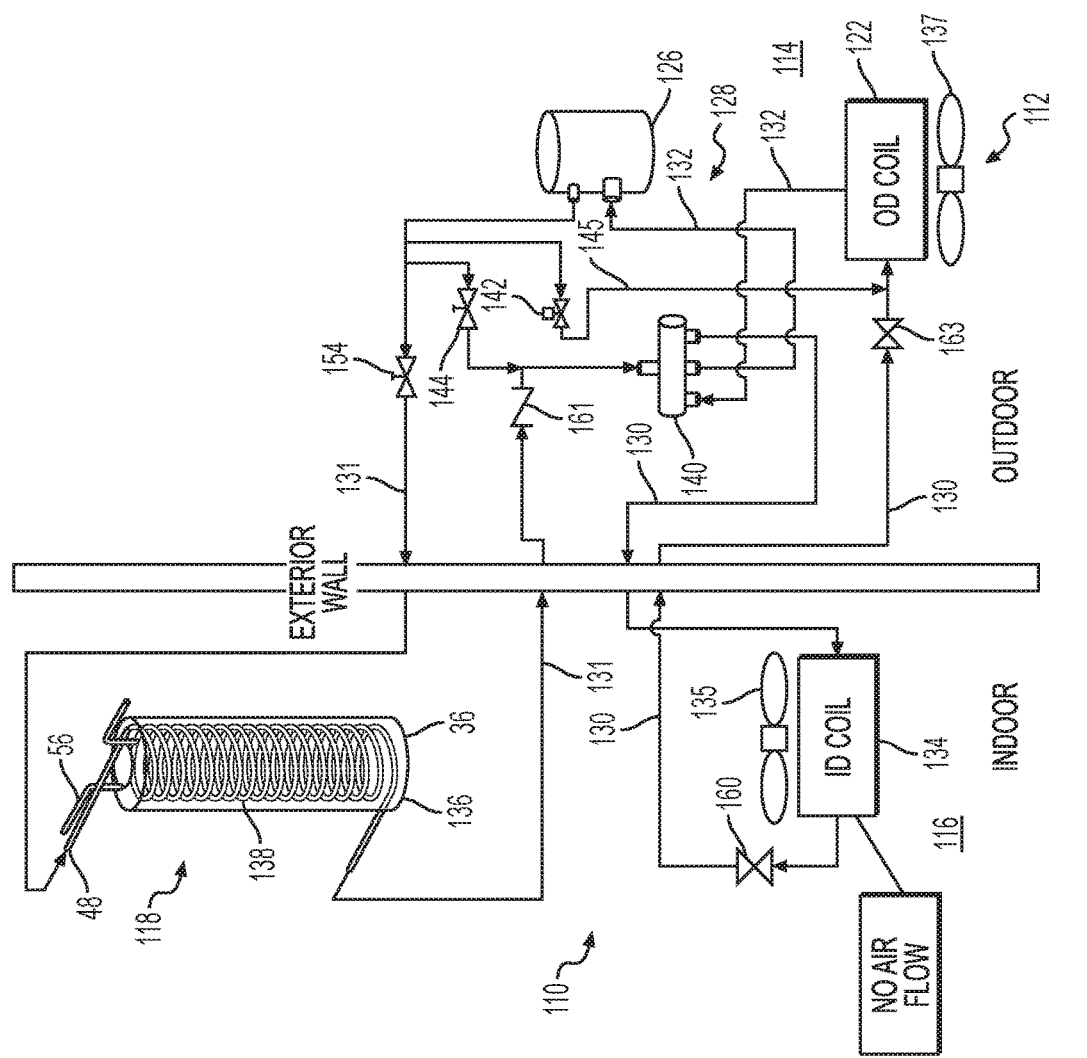
FIG. 13 is a schematic diagram of the system as in FIG. 8, but with the air conditioning system providing refrigerant heat to a water heater without providing conditioned space air.

Referring to FIG. 13, electronic control system 120 receives a signal from the water heater water temperature sensor indicating that water heating is needed, when system 110 is in neither an air heating mode nor an air cooling mode, control system 120 sets valves 154, 144, and 140 to an air heating configuration, as discussed above with regard to FIG. 12, but does not activate air handler fan 135 because there is no call from the indoor thermostat to provide conditioned air to the conditioned space. Refrigerant flows through the refrigerant loop as described with regard to FIG. 12.

Again, because refrigerant heat exchanger 138 receives hot refrigerant gas directly from compressor 126, the system's ability to contribute heat to the water heater remains high in this mode of operation. However, the deactivation of air handler fan 135 eliminates the corresponding air flow over condenser coil 134, thereby reducing the system's ability to remove heat from the circulating refrigerant flow. This may undesirably increase pressure at the output of compressor 126. Where compressor 126 is a variable speed compressor, the control system changes the compressor's output to a lower level, e.g. 10,000 BTU/hr. Alternatively, electronic control system 120 opens bypass valve 142. This causes hot refrigerant gas from compressor 126 to bypass heat exchanger 138 and coil 134 and flow directly to coil 122 for return to compressor 126. As described above, the opening of bypass valve 142 may further decrease system efficiency, thereby increasing the likelihood of a switch to water heater activation.

It should be understood that the present system may be operated in various manners. For example, as discussed above, each of the embodiments described with regard to FIGS. 1-13 can be operated based on a comparison of system efficiency when using the refrigerant heat exchanger to system efficiency when using the water heater's heat source, and relying on that comparison as the deciding factor whether to utilize the heat exchanger throughout the water heater's heat cycle. Rather than relying on the efficiency comparison, however, in a further embodiment the electronic control system, upon receiving a signal from the water heater temperature sensor indicating a need to heat water, actuates the refrigerant heat exchanger coil and maintains the heat exchanger coil active until the temperature signal reaches a predetermined point. This predetermined cut-off point may be determined through testing and comparison of system efficiencies alternatively utilizing the refrigerant flow heat exchanger and the water heater heat source. That is, the systems are operated under each of the alternative arrangements, and under similar operating conditions. System efficiencies are compared, and a temperature cut off is selected based on the comparison. Furthermore, temperature may be measured at various points in the water heater, as should be understood in the art, and in certain embodiments the electronic control system responds to water temperature taken at the lower portion of the lower tank.

Still further, in optional constructions of the air conditioning and water heating systems described above, the electronically controlled regulator valves may be replaced with fixed orifice solenoid valves, and the flow of hot refrigerant to the water heater refrigerant-to-PCM-to-water heat exchanger coils may instead be regulated by compressor discharge (head) pressure using an outdoor or indoor fan speed controller which is, in turn, controlled by the sensed water temperature in the water heater tank.

Modifications and variations to the particular embodiments of the present invention may be practiced by those of ordinary skill in the art, without departing from the spirit and scope of the present invention, which is more particularly set forth in the appended claims. In addition, it should be understood that aspects of the various embodiments may be interchanged to both in whole or in part. Furthermore, those of ordinary skill in the art will appreciate that the foregoing description is by way of example only and is not intended to limit the invention so further described in the appended claims.

What is claimed is:

1. An apparatus for heating water, comprising:
   a first tank defining a first inner volume for storing the water that is to be heated;
   a second tank that defines a second inner volume that is adjacent the first inner volume so that heat transfers between the first inner volume and the second inner volume, wherein the second inner volume is fluidly isolated from the water in the first inner volume, and wherein the second inner volume contains a phase change material; and
   an air conditioning system comprising a refrigerant path defined by a refrigerant conduit, a portion of the refrigerant conduit passing through the second inner volume, wherein the portion of the refrigerant conduit that passes through the second inner volume is disposed radially inward and spaced apart from a second tank sidewall of the second tank such that the phase change material encases an outer surface of the refrigerant conduit over a majority of a length of the portion of the refrigerant conduit that is within the second inner volume.

2. The apparatus as in claim 1, wherein the second tank extends within the first tank.

3. The apparatus of claim 1:
wherein the first tank is defined by a first tank sidewall, a first tank top wall, and a flat bottom wall that is annular, the flat bottom wall defining a circular bore,
wherein the second tank extends into the first tank through the circular bore in the flat bottom wall of the first tank such that the water in the first inner volume of the first tank surrounds the second tank and the second inner volume is adjacent the first inner volume across the second tank sidewall of the second tank,
wherein the second tank comprises the second tank sidewall, a second tank top wall, and an open bottom end, the second tank top wall being spaced apart from the first tank top wall such that a first height of the first tank from the flat bottom wall to the first tank top wall is greater than a second height of the second tank from the open bottom end to the second tank top wall,
wherein the apparatus further comprises a bottom plate that is coupled to the flat bottom wall of the first tank such that a portion of the bottom plate covers the open bottom end of the second tank, and
wherein the bottom plate comprises a sealed bushing configured to receive an inlet end of and an outlet end of the portion of the refrigerant conduit that passes through the second inner volume.

4. The apparatus as in claim 1, wherein the air conditioning system comprises a compressor, refrigerant that flows through the refrigerant path responsively to the compressor, an evaporator through which the refrigerant path passes, and an air handler fan disposed with respect to the evaporator so that when the air handler fan moves an air flow in communication with the evaporator, the evaporator conditions the air flow.

5. The apparatus as in claim 2, wherein the refrigerant path defines a closed flow loop, wherein a remaining portion of the refrigerant conduit is formed in parallel with the portion of the refrigerant conduit that passes through the second inner volume so that the remaining portion bypasses the second inner volume in the closed loop, and wherein the apparatus also comprises at least one valve disposed within the refrigerant path that controls refrigerant flow through the refrigerant path and that is selectively configurable to alternatively direct refrigerant flow through the second inner volume or through the remaining portion.

6. The apparatus as in claim 5, further comprising a controller in operative communication with the at least one valve and comprising a computer-readable medium containing program instructions executable by the controller to selectively configure the at least one valve to direct refrigerant flow in the refrigerant path through the second inner volume or through the remaining portion.

7. The apparatus as in claim 5, further comprising at least one sensor that outputs a signal representative of a system operating parameter, a controller in operative communication with the sensor to receive the signal, and a computer-readable medium containing program instructions executable by the controller to control the at least one valve to selectively allow or block refrigerant flow through the second inner volume in response to the signal.

8. The apparatus as in claim 7, wherein the air handler fan is in communication with a conditioned space, and wherein the sensor comprises a thermostat that is operable to detect an air temperature of the conditioned space and output a signal to the controller that corresponds to the air temperature.

9. An apparatus for heating water, comprising:
a first tank defining a first inner volume for storing the water that is to be heated and having a heating assembly in operative communication with the first inner volume so that the heating assembly contributes heat to the water in the first inner volume;
a second tank extending within the first tank and that defines a second inner volume that is adjacent the first inner volume so that heat transfers between the first inner volume and the second inner volume, wherein the second inner volume is fluidly isolated from the water, and wherein the second inner volume contains a phase change material; and
an air conditioning system comprising
an air handler fan actuatable to move an air flow through an air flow path into a conditioned space,
a refrigerant path that is defined by a refrigerant conduit, a portion of the refrigerant conduit passing through the air flow path and another portion of the refrigerant conduit passing through the second inner volume,
a compressor disposed in the refrigerant path and being actuatable to move refrigerant through the refrigerant path, and
refrigerant that flows through the refrigerant path responsively to the compressor,
wherein the other portion of the refrigerant conduit that passes through the second inner volume is disposed radially inward and spaced apart from a second tank sidewall of the second tank such that the phase change material encases an outer surface of the refrigerant conduit over a majority of a length of the other portion of the refrigerant conduit that is within the second inner volume.

10. The apparatus of claim 9, wherein the heater assembly comprises a heating element, and wherein a portion of the heating element extends radially inward from a first tank sidewall of the first tank towards the second tank sidewall of the second tank and a remainder portion of the heating element is disposed between and extends parallel to the first tank sidewall of the first tank and the second tank sidewall of the second tank.

11. The apparatus as in claim 9, further comprising
a controller that is in operative communication with the first tank, the air handler fan, and the refrigerant path, and
a computer-readable medium containing program instructions executable by the controller to actuate the heating assembly in response to a temperature of the water in the first tank, control actuation of the air handler fan, and control refrigerant flow through the refrigerant path.

12. The apparatus as in claim 11, wherein
the refrigerant path defines a closed loop and defines the portion of the refrigerant conduit in parallel with the other portion of the refrigerant path that passes through the second inner volume so that the portion bypasses the second inner volume in the closed loop,
the air conditioning system comprises a plurality of valves disposed within the refrigerant path that control refrigerant flow through the refrigerant path and that is selectively configurable to alternatively direct refrigerant flow through the second inner volume or through the portion, and a thermostat operable to measure ambient temperature in the conditioned space and to output a signal corresponding to ambient temperature in the conditioned space, and the controller is in operative communication with the thermostat to receive the signal and, in response thereto the program instructions are executable by the controller in a first mode of operation, to actuate the air handler fan to move the air flow through the air flow path, actuate the compressor to move refrigerant through the refrigerant path, and configure the valves to direct refrigerant flow through the second inner volume, and in a second mode of operation, to actuate the air handler fan to move the air flow through the air flow path, actuate the compressor to move refrigerant through the refrigerant path, and configure the valves to direct refrigerant flow through the portion.

13. The apparatus as in claim 11, wherein the second tank is generally cylindrical and elongated in the axial direction of the generally cylindrical second tank.

14. The apparatus as in claim 13, wherein the refrigerant path passing through the second inner volume comprises a conduit formed in a coil within the second inner volume, defining a center axis of the coil.

15. The apparatus as in claim 14, wherein the center axis of the coil is coincident with an axis of the generally cylindrical second tank, over a majority of a length of the generally cylindrical second tank in the axial direction.

16. The apparatus as in claim 11, wherein the phase change material comprises stearic acid.

17. The apparatus as in claim 11, wherein the melting point of the phase change material is within a range of about 150° F. to about 160° F.

18. The apparatus as in claim 11, further comprising at least one sensor in communication with the first inner volume and that outputs a signal representative of temperature of water in the first inner volume, wherein the controller is in operative communication with the sensor to receive the signal and the program instructions are executable by the controller to actuate the heating assembly in response to the signal.

19. The apparatus as in claim 11, wherein the program instructions are executable by the controller to control actuation of the heating assembly to control a temperature of water in the first inner volume toward a predetermined high set point temperature, and wherein a solid to liquid phase change temperature of the phase change material is above the predetermined high set point temperature.

20. The apparatus as in claim 11, wherein the phase change material comprises paraffin wax.

21. An apparatus for heating water, comprising:
a first tank defining a first inner volume within the first tank for storing the water;
a second tank surrounding an exterior of the first tank and that defines a second inner volume adjacent to the first inner volume so that heat transfers from the second inner volume and the first inner volume, wherein the second inner volume is fluidly isolated from the water in the first inner volume, and wherein the second inner volume contains a phase change material; and
an air conditioning system comprising a refrigerant path defined by a refrigerant conduit, a portion of the refrigerant conduit passing through the second inner volume, wherein the portion of the refrigerant conduit that passes through the second inner volume is disposed radially inward and spaced apart from a second tank sidewall of the second tank such that the phase change material encases an outer surface of the refrigerant conduit over a majority of a length of the portion of the refrigerant conduit that is within the second inner volume.

22. An apparatus for heating water, comprising:
a first tank defining a first inner volume for storing water;
a second tank that defines a second inner volume that is adjacent the first inner volume so that heat transfers between the first inner volume and the second inner volume, wherein the second inner volume is fluidly isolated from water in the first inner volume, and wherein the second inner volume contains a phase change material; and
a conduit that passes through the second inner volume and that extends outward of both the first tank and the second tank, wherein a portion of the conduit that passes through the second inner volume is disposed radially inward and spaced apart from a second tank sidewall of the second tank such that the phase change material encases an outer surface of the conduit over a majority of a length of the portion of the conduit that is within the second inner volume.

23. The apparatus as in claim 22, wherein the second tank extends within the first tank.

24. The apparatus as in claim 22, wherein the second tank is exterior of the first tank.

25. The apparatus as in claim 22, including at least one electric heating element extending through a wall of the first tank and into the first inner volume so that the electric heating element is disposed to provide heat to water within the first inner volume.

26. The apparatus as in claim 22, including a gas burner disposed adjacent a wall of the first tank so that ignition of the gas burner when gas is fed to the gas burner contributes heat to water within the first inner volume.

27. The apparatus as in claim 26, including a flue pipe that extends from the wall through the first inner volume.

28. The apparatus as in claim 27, wherein the flue pipe extends through the first inner volume and through the second inner volume.

29. A method for heating water, comprising:
providing a first tank defining a first inner volume for storing the water that is to be heated;
providing a second tank that defines a second inner volume that is adjacent the first inner volume so that heat transfers between the first inner volume and the second inner volume, wherein the second inner volume is fluidly isolated from the water in the first inner volume, and wherein the second inner volume contains a phase change material;
providing an air conditioning system comprising a refrigerant path defined by a refrigerant conduit, a portion of the refrigerant conduit passing through the second inner volume, wherein the portion of the refrigerant conduit that passes through the second inner volume is disposed radially inward and spaced apart from a sidewall of the second tank such that the phase change material encases an outer surface of the refrigerant conduit over a majority of a length of the portion of the refrigerant conduit that is within the second inner volume; and
moving refrigerant through the refrigerant path, including through the second inner volume.

* * * * *